United States Patent [19]

Yoshida et al.

[11] Patent Number: 4,992,953
[45] Date of Patent: Feb. 12, 1991

[54] COMPUTER ASSISTED DESIGN METHOD AND APPARATUS

[75] Inventors: Naoto Yoshida; Toshiaki Yoshinaga; Hisao Murakawa; Kenji Hayashi, all of Hitachi, Japan

[73] Assignee: Hitachi, Ltd., Tokyo, Japan

[21] Appl. No.: 207,943

[22] Filed: Jun. 17, 1988

[30] Foreign Application Priority Data

Jun. 19, 1987 [JP] Japan .................. 62-151164

[51] Int. Cl.[5] ............................................ G06F 15/60
[52] U.S. Cl. .................... 364/512; 364/513; 364/491
[58] Field of Search ................ 364/488-491, 364/514, 513, 474.05, 521, 518, 512; 137/177, 173, 181

[56] References Cited

U.S. PATENT DOCUMENTS

| 1,495,671 | 5/1974 | Castellano | 137/203 |
| 1,703,166 | 2/1929 | Penniman, Jr. | 137/181 |
| 2,103,057 | 12/1937 | Blumer | 137/181 |
| 2,636,506 | 4/1953 | St. Clair | 137/177 |
| 4,700,317 | 10/1987 | Watanabe et al. | 364/521 |
| 4,789,944 | 12/1988 | Wada et al. | 364/490 |
| 4,805,113 | 2/1989 | Ishii et al. | 364/490 |
| 4,813,013 | 3/1989 | Dunn | 364/488 |
| 4,831,546 | 5/1989 | Mitsuta et al. | 364/512 |

FOREIGN PATENT DOCUMENTS 60-079470 5/1985 Japan .
61-213969 9/1986 Japan .

Primary Examiner—Parshotam S. Lall
Assistant Examiner—Michael Zanelli
Attorney, Agent, or Firm—Antonelli, Terry, Stout & Kraus

[57] ABSTRACT

A computer assisted design apparatus displays on a display device a graphic pattern of a layout object and a graphic pattern of a liquid stay area for the layout object. The liquid stay area includes a drain stay area and a vent stay area to which a drain discharge path and a vent discharge path are connected, respectively. Graphic data for representing the graphic pattern of the liquid stay area is prepared based on the layout object data relating to the layout object specified by an input device and a liquid discharger arrangement rule.

19 Claims, 33 Drawing Sheets

FIG. 3

| EQUIPMENT CODE | PLANT CODE | BUILDING CODE | TYPE | POSITION | | |
|---|---|---|---|---|---|---|
| | | | | X | Y | Z |
| P22C001 | M2 | Hx/B | PUMP | 38000 | 32750 | -1100 |

| NOZZLE | SIZE | | |
|---|---|---|---|
| | W | L | H |
| P22C001-1 | 900 | 12000 | 1500 |
| P22C001-2 | | | |

FIG. 4

| NOZZLE CODE | CONNECTION SYSTEM | POSITION | | |
|---|---|---|---|---|
| | | X | Y | Z |
| P22C001-1 | TCW-4 | 37500 | 33200 | -11000 |

FIG. 5

| NAME CODE | PLANT CODE | BUILDING CODE | SYSTEM CODE | DIAMETER | TEMPER-ATURE | PRESSURE |
|---|---|---|---|---|---|---|
| TCW-4 | K4 | HX/B | TCW | 600 | 40 | 3.6 |
| RADIATION DENSITY ($\mu$O/CC) | FLUID NAME | PRESSURE TEST | WATER FLASHING | START POINT | END POINT | |
| 0.001 | LIQUID | WATER PRESSURE | NONE | P22C001-1 | P42B001-3 | |
| INTERMEDIATE EQUIPMENT INFORMATION ||||||| 
| NAME | TYPE | SPECIFICATION |||||
| CH-1 | CHECK VALVE | PUMP IN UPSTREAM |||||
| S-1 | STRAINER | DISASSEMBLING REQUIRED |||||
| CV-1 | CONTROL VALVE | DIAMETER = 600 |||||
| RE-1 | REDUCER | CONCENTRIC, 600 x 800 |||||
| RE-2 | REDUCER | CONCENTRIC, 600 x 800 |||||
| RO-1 | ORIFICE | VENT |||||
| S-2 | STRAINER | DISASSEMBLING REQUIRED |||||
| CV-2 | CONTROL VALVE | DIAMETER = 500, DOWNSTREAM = CONDENSER |||||

FIG. 6

| NAME CODE | REF. POINT NO. | NAME | TYPE | CONN. LINE CODE | ELBOW RADI | POSITION COORDINATES | | |
|---|---|---|---|---|---|---|---|---|
| | | | | | | X | Y | Z |
| TCW-4 | 1 | P22 C001-1 | PUMP NOZZLE | — | — | 37500 | 33200 | -11000 |
| | 2 | CH-1 | CHECK VALVE | — | — | 37500 | 34700 | -11000 |
| | 3 | EL-1 | ELBOW | — | 900 | 37500 | 37500 | -11000 |
| | 4 | S-1 | STRAINER | — | — | 33500 | 37500 | -11000 |
| | 5 | EL-2 | ELBOW | — | 900 | 30200 | 37500 | -11000 |
| | 6 | EL-3 | ELBOW | — | 1200 | 30200 | 42500 | -11000 |
| | 7 | CV-1 | CONTROL VALVE | — | — | 30200 | 42500 | -7450 |
| | 8 | EL-4 | ELBOW | — | 1200 | 30200 | 42500 | -5600 |
| | 9 | RE-1 | REDUCER | — | — | 30200 | 47000 | -5600 |
| | 10 | RE-2 | REDUCER | — | — | 30200 | 51000 | -5600 |
| | 11 | EL-5 | ELBOW | — | 600 | 30200 | 54200 | -5600 |
| | 12 | EL-6 | ELBOW | — | 600 | 30200 | 54200 | -7200 |
| | 13 | DR-1 | DRAIN SEAT | TCW-511 | — | 30200 | 55200 | -7200 |
| | 14 | RO-1 | ORIFICE | — | — | 30200 | 56700 | -7200 |
| | 15 | EL-7 | ELBOW | — | 900 | 30200 | 58700 | -7200 |
| | 16 | EL-8 | ELBOW | — | 900 | 30200 | 58700 | -3200 |
| | 17 | S-2 | STRAINER | — | — | 27400 | 58700 | -3200 |
| | 18 | CV-2 | CONTROL VALUE | — | — | 25500 | 58700 | -3200 |
| | 19 | P42 B001-3 | CONDENSER NOZZLE | — | — | 23200 | 58700 | -3200 |

FIG. 7A

| NO. | NUMBER OF CONDITION PART DATA | CONDITION PART |||
|---|---|---|---|---|
| | | FLUID | DIAMETER | LEVEL |
| 1 | 3 | LIQUID | $\geq 65$ | HIGH POINT |

| CONCLUSION PART || ARRANGEMENT RULE |
|---|---|---|
| ARRANGEMENT | OBJECT | |
| CURRENT POINT | VENT | ARRANGE VENT AT HIGH POINT OF LIQUID PIPE HAVING DIAMETER OF $\geq 65$ |

FIG. 7B

| NO. | NUMBER OF CONDITION PART DATA | CONDITION PART |||
|---|---|---|---|---|
| | | FLUID | DIAMETER | LEVEL |
| 2 | 3 | LIQUID | $\geq 65$ | LOW POINT |

| CONCLUSION PART || ARRANGEMENT RULE |
|---|---|---|
| ARRANGEMENT | OBJECT | |
| CURRENT POINT | DRAIN | ARRANGE DRAIN AT LOW POINT OF LIQUID PIPE HAVING DIAMETER OF $\geq 65$ |

FIG. 7C

| NO. | NUMBER OF CONDITION PART DATA | CONDITION PART |||
|---|---|---|---|---|
| | | SPECIALITY | DIAMETER | DOWNSTREAM |
| 13 | 3 | CONTROL VALVE | < MOTHER PIPE SIZE | CONDENSER |

| CONCLUSION PART || ARRANGEMENT RULE |
|---|---|---|
| ARRANGEMENT | OBJECT | |
| UPSTREAM | DRAIN | ARRANGE DRAIN UPSTREAM IF DOWNSTREAM OF CONTROL VALVE HAVING SMALLER VALVE SIZE THAN MOTHER PIPE IS CONNECTED TO CONDENSER |

FIG. 7D

| NO. | NUMBER OF CONDITION PART DATA | CONDITION PART |||
|---|---|---|---|---|
| | | SPECIALITY | UPSTREAM | DOWNSTREAM |
| 15 | 3 | CHECK VALVE | PUMP | RISE |

| CONCLUSION PART || ARRANGEMENT RULE |
|---|---|---|
| ARRANGEMENT | OBJECT | |
| DOWNSTREAM | DRAIN | ARRANGE DRAIN DOWNSTREAM IF PIPE RISES AFTER CHECK VALVE AT DISCHARGE PORT OF PUMP |

FIG. 15

| NAME CODE | REF. POINT NO. | NAME | LEVEL COORDINATE (Z) | LEVEL FLAG | DIAMETER | UPPER PLANE LEVEL COORDINATE ($Z_1$) | LOWER PLANE LEVEL COORDINATE ($Z_2$) |
|---|---|---|---|---|---|---|---|
| TCW-4 | 1 | P22C001-1 | -11000 | SH | 600 | -10700 | -11300 |
| | 2 | CH-1 | -11000 | SH | 600 | -10700 | -11300 |
| | 3 | EL-1 | -11000 | SH | 600 | -10700 | -11300 |
| | 4 | S-1 | -11000 | SH | 600 | -10700 | -11300 |
| | 5 | EL-2 | -11000 | SH | 600 | -10700 | -11300 |
| | 6 | EL-3 | -11000 | SH | 600 | -10700 | -11300 |
| | 7 | CV-1 | -7450 | SC | 600 | -7450 | -7450 |
| | 8 | EL-4 | -5600 | SH | 600 | -5300 | -5900 |
| | 9 | RE-1 | -5600 | SH | 800 | -5200 | -6000 |
| | 10 | RE-2 | -5600 | SH | 800 | -5200 | -6000 |
| | 11 | EL-5 | -5600 | SH | 600 | -5300 | -5900 |
| | 12 | EL-6 | -7200 | SH | 600 | -6900 | -7500 |
| | 13 | DR-1 | -7200 | SH | 600 | -6900 | -7500 |
| | 14 | RO-1 | -7200 | SH | 600 | -6900 | -7500 |
| | 15 | EL-7 | -7200 | SH | 600 | -6900 | -7500 |
| | 16 | EL-8 | -3200 | SH | 600 | -2900 | -3500 |
| | 17 | S-2 | -3200 | SH | 600 | -2900 | -3500 |
| | 18 | CV-2 | -3200 | SH | 600 | -2900 | -3500 |
| | 19 | P42B001-3 | -3200 | SH | 600 | -2900 | -3500 |

FIG. 17

| NAME CODE | REF. POINT NO. | NAME | UPPER PLANE LEVEL | UPPER PLANE LEVEL NO. | LOWER PLANE LEVEL | LOWER PLANE LEVEL NO. |
|---|---|---|---|---|---|---|
| TCW-4 | 1 | P22C001-1 | -10700 | 1 | -11300 | 1 |
| | 2 | CH-1 | -10700 | 1 | -11300 | 1 |
| | 3 | EL-1 | -10700 | 1 | -11300 | 1 |
| | 4 | S-1 | -10700 | 1 | -11300 | 1 |
| | 5 | EL-2 | -10700 | 1 | -11300 | 1 |
| | 6 | EL-3 | -10700 | 1 | -11300 | 1 |
| | 7 | CV-1 | -7450 | 2 | -7450 | 2 |
| | 8 | EL-4 | -5300 | 3 | -5900 | 3 |
| | 9 | RE-1 | -5200 | 4 | -6000 | 4 |
| | 10 | RE-2 | -5200 | 4 | -6000 | 4 |
| | 11 | EL-5 | -5300 | 5 | -5900 | 5 |
| | 12 | EL-6 | -6900 | 6 | -7500 | 6 |
| | 13 | DR-1 | -6900 | 6 | -7500 | 6 |
| | 14 | RO-1 | -6900 | 6 | -7500 | 6 |
| | 15 | EL-7 | -6900 | 6 | -7500 | 6 |
| | 16 | EL-8 | -2900 | 7 | -3500 | 7 |
| | 17 | S-2 | -2900 | 7 | -3500 | 7 |
| | 18 | CV-2 | -2900 | 7 | -3500 | 7 |
| | 19 | P42B001-3 | -2900 | 7 | -3500 | 7 |

FIG. 18

| NAME CODE | REF. POINT NO. | NAME | LOW POINT | HIGH POINT |
|---|---|---|---|---|
| TCW-4 | 1 | P22C001-1 | — | — |
| | 2 | CH-1 | — | — |
| | 3 | EL-1 | — | — |
| | 4 | S-1 | — | — |
| | 5 | EL-2 | — | — |
| | 6 | EL-3 | — | — |
| | 7 | CV-1 | — | — |
| | 8 | EL-4 | — | — |
| | 9 | RE-1 | L | H |
| | 10 | RE-2 | L | H |
| | 11 | EL-5 | — | — |
| | 12 | EL-6 | L | — |
| | 13 | DR-1 | L | — |
| | 14 | RO-1 | L | — |
| | 15 | EL-7 | L | — |
| | 16 | EL-8 | — | — |
| | 17 | S-2 | — | — |
| | 18 | CV-2 | — | — |
| | 19 | P42B001-3 | — | — |

FIG. 21

| NAME CODE | REF. POINT NO. | NAME | DRAIN STAY | ARRANGE-MENT RULE | AIR STAY | ARRANGE-MENT RULE |
|---|---|---|---|---|---|---|
| TCW-4 | 1 | P22C001-1 | D | 20 | — | — |
| | 2 | CH-1 | D | 15,20 | — | — |
| | 3 | EL-1 | D | 15,20 | — | — |
| | 4 | S-1 | D | 15,20 | — | — |
| | 5 | EL-2 | D | 15 | — | — |
| | 6 | EL-3 | D | 15 | — | — |
| | 7 | CV-1 | — | — | — | — |
| | 8 | EL-4 | — | — | — | — |
| | 9 | RE-1 | D | 2 | V | 1 |
| | 10 | RE-2 | D | 2 | V | 1 |
| | 11 | EL-5 | — | — | — | — |
| | 12 | EL-6 | D | 2,17 | — | — |
| | 13 | DR-1 | D | 2,17 | — | — |
| | 14 | RO-1 | D | 2,17 | — | — |
| | 15 | EL-7 | D | 2,17 | — | — |
| | 16 | EL-8 | D | 20 | — | — |
| | 17 | S-2 | D | 13,20 | — | — |
| | 18 | CV-2 | D | 13 | — | — |
| | 19 | P42B001-3 | — | — | — | — |

F I G. 22
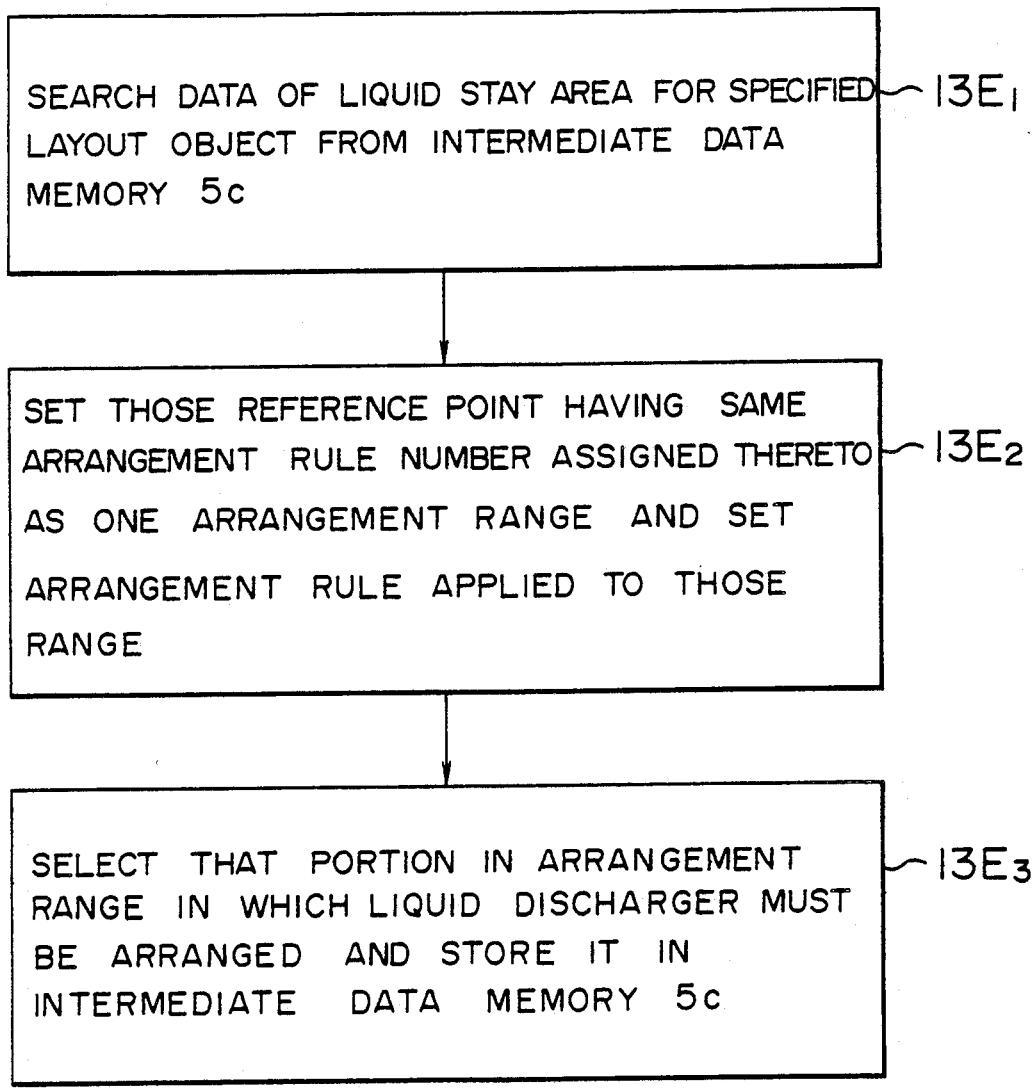

FIG. 23A

| No. | DRAIN STAY AREA RANGE | | ARRANGEMENT RULE |
|---|---|---|---|
| | START POINT | END POINT | |
| 1 | 1 | 4 | 20 |
| 2 | 2 | 6 | 15 |
| 3 | 9 | 10 | 2 |
| 4 | 12 | 15 | 2 |
| 5 | 12 | 15 | 17 |
| 6 | 16 | 17 | 20 |
| 7 | 17 | 18 | 13 |

FIG. 23B

| No. | AIR STAY AREA RANGE | | ARRANGEMENT RULE |
|---|---|---|---|
| | START POINT | END POINT | |
| 1 | 9 | 10 | 1 |

FIG. 24A

| No. | DRAIN STAY AREA RANGE | | ARRANGEMENT RULE |
|---|---|---|---|
| | START POINT | END POINT | |
| 1 | 2 | 4 | 15, 20 |
| 2 | 9 | 10 | 2 |
| 3 | 12 | 15 | 2, 17 |
| 4 | 16 | 17 | 20 |
| 5 | 17 | 18 | 13 |

FIG. 24B

| No. | AIR STAY AREA RANGE | | ARRANGEMENT RULE |
|---|---|---|---|
| | START POINT | END POINT | |
| 1 | 9 | 10 | 1 |

F I G. 30
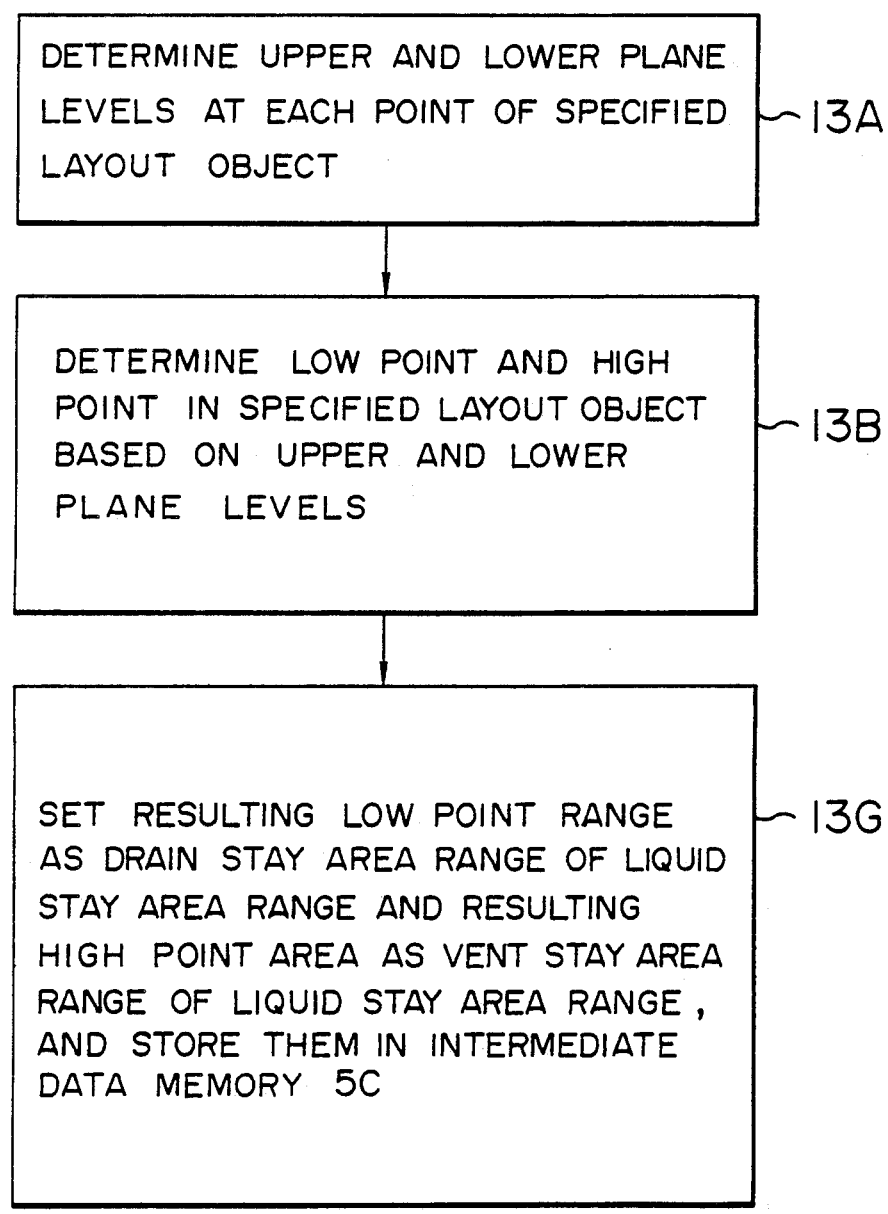

COMPUTER ASSISTED DESIGN METHOD AND APPARATUS

BACKGROUND OF THE INVENTION

The present invention relates to design assistance method and design assistance apparatus therefor, and more particularly to computer assisted method and apparatus suitable for arranging drains and vents in a plant by a computer.

In a layout plan of layout objects in a plant (equipments and pipes of the plant), a method for automatically generating connecting paths in a spatial layout plan for automatically determining optimum piping paths of pipes in accordance with arrangement data of equipments in an area of layout objects and design reference data is proposed by JP-A-60-79470.

JP-A-61-213969 (corresponding to U.S. patent application Ser. No. 838,957 filed on Mar. 12, 1986 which issued as U.S. Pat. No. 4,789,944 on Dec. 6, 1988) teaches layout of pipes while a restriction area for the design objects (an area in which the design objects cannot be arranged) is graphically displayed on a screen of a display device.

In the plant, vent pipes and drain pipes are arranged to discharge liquid in the plant from a system. Usually, the vent pipes and drain pipes are arranged in places which allow easy discharge (vent or drain) of the liquid in the plant from the system. For example, the vent pipes are connected to locally high areas in the plant system and the drain pipes are connected to locally low areas in the system. However, the design positions of the vent pipes and drain pipes are determined by a designer while he/she watches design drawings and data. As a result, a long time is required to determine the design positions and there is a risk that the pipes are not arranged in right places.

In the computer assisted design apparatus disclosed in the above references, no effective means for setting the places of the liquid discharge pipes such as drain pipes and vent pipes is taught, and the designer has to determine the places of the drain pipes and vent pipes while he/she watches the drawings and data. In the prior art, a position of a stay area of the liquid to be discharged, in the plant system at which the drain pipes are to be arranged cannot be properly determined. The liquid stay area may include a vent stay area and a drain stay area.

SUMMARY OF THE INVENTION

It is an object of the present invention to provide a design assistance method and apparatus which allow easy determination of liquid stay areas at which liquid discharge paths are to be mounted.

It is another object of the present invention to provide a design assistance method and apparatus which can precisely determine a position of a liquid stay area.

Still another object of the present invention is to provide a design assistance method and apparatus which allow easy checking whether a liquid discharge path is connected to a predetermined point.

A first feature of the present invention to achieve the first object of the present invention is to prepare second graphic data to graphically display a liquid stay area for a layout object based on selected layout object data and to display on a display device a pattern of the liquid stay area and the layout object based on first graphic data to graphically represent the layout object selected from memory means and the second graphic data. Since the layout object pattern and the liquid stay area are graphically displayed on the display device, the position of the liquid stay area in the layout object at which the liquid discharge path is to be arranged can be easily determined.

A second feature of the present invention to achieve the second object of the present invention is to prepare the second graphic data of the first feature based on selected layout object data by use of a liquid discharger arrangement rule. Since the liquid discharger arrangement rule is used to prepare the second graphic data, the position of the liquid stay area at which the liquid discharge path is to be arranged can be precisely determined.

A third feature of the present invention to achieve the third object of the present invention is to display the liquid discharge path and the liquid stay area. Thus, the operator can readily determine whether the liquid discharge path is located at a right position.

BRIEF DESCRIPTION OF THE DRAWINGS

FIG. 15 illustrates data stored in an intermediate data storage by the process of the step 13A, FIG. 17 illustrates data stored in the intermediate data storage at the end of a step $13B_3$ of FIG. 16, FIG. 18 illustrates data stored in the intermediate data storage at the end of a step $13B_8$ of FIG. 16, FIG. 21 illustrates data stored in the intermediate data storage at the end of the step 13D, FIG. 22 shows a detailed process of a step 13E of FIG. 13, FIGS. 23A and 23B illustrate data produced in a step $13E_2$ of FIG. 22, FIGS. 24A and 24B illustrate data produced in a step $13E_3$ of FIG. 22, FIG. 30 shows a detailed process of a step 13F of FIG. 29.

DESCRIPTION OF THE PREFERRED EMBODIMENTS

Figure 1:
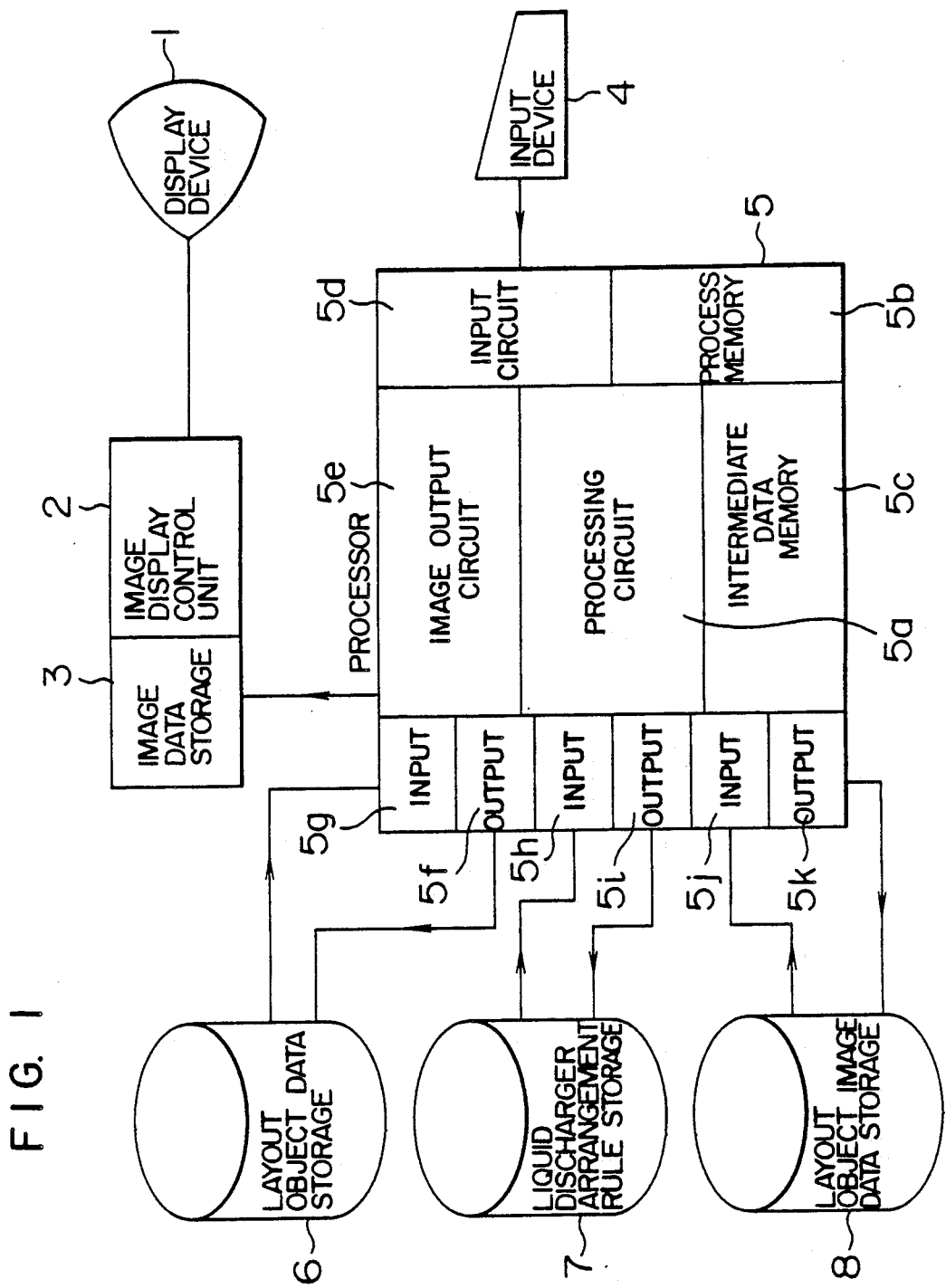
FIG. 1 shows a configuration of one embodiment of a computer assisted design apparatus of the present invention.
Figure 2:
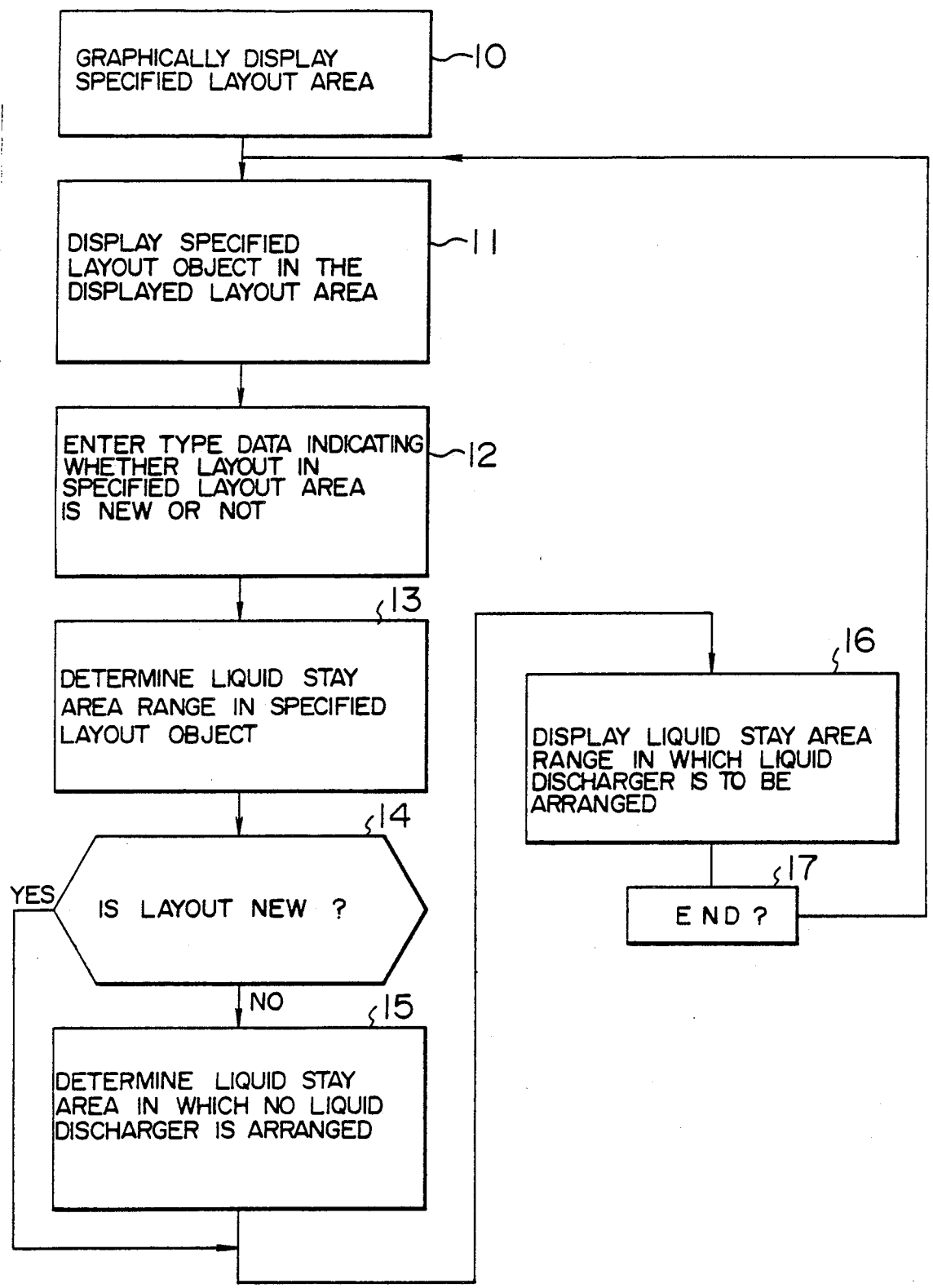
FIG. 2 illustrates a process executed by the computer assisted design apparatus of FIG. 1, FIGS. 3, 4, 5 and 6 illustrate layout object data stored in a layout object data storage of FIG. 1, FIGS. 7a–7d illustrate liquid discharger arrangement rules arrangement rule stored in a liquid discharger arrangement rule storage of FIG. 1.

One embodiment of the computer assisted design apparatus of the present invention to be used for plant design is explained with reference to FIGS. 1 and 2. The present embodiment of the computer assisted design apparatus can interactively produce an image on a screen of a display device. FIG. 1 shows a hardware configuration of the present embodiment of the computer assisted design apparatus and FIG. 2 shows an outline of a program or process executed by the design device.

The computer assisted design apparatus in the present embodiment comprises a display device 1, an image display control unit 2, an image data storage 3, an input device (for example, keyboard) 4, a processing unit 5, a layout object data storage 6, a liquid discharger arrangement rule storage 7 and a layout object image data storage 8. The computer assisted design apparatus also has a design attachment data storage (not shown).

The processing unit 5 comprises a processing circuit 5a, a process memory 5b, an intermediate data memory 5c, an input circuit 5d, an image data output circuit 5e, a layout object data retrieval signal output circuit 5f, a layout object data input circuit 5g, a liquid discharger arrangement rule input circuit 5h, a liquid discharger arrangement rule retrieval signal output circuit 5i, a layout object image data input circuit 5j, and a layout object image data retrieval signal output circuit 5k. The processing unit 5 also has a design attachment data input circuit and a design attachment data retrieval signal output circuit (not shown). Those design attachment data input/output circuits are connected to the design attachment data storage. The design attachments represent units and equipments associated with a layout area in which a layout object is arranged.

The image data stored in the image data storage 3 for display on the display device 1 is produced by the processing unit 5. The image display control unit 2 fetches the image data stored in the image data storage 3 and displays it on the display device 1.

The layout object data storage 6 stores data representing the layout objects (pipes, equipments), particularly data representing components of the layout objects. An example of the stored layout object data is shown in FIG. 3 of JP-A-61-110797 (FIG. 2 of corresponding U.S. patent application Ser. No. 50,314 filed on May 15, 1987). It shows data on a pipe R1 and an equipment C1. The layout object data include a diameter of the pipe and x, y, z coordinates of start point, end point and curve point, for the pipe, and coordinates of a center position and dimensions for the equipment. In the present embodiment, the layout object data storage 6 further stores layout object data shown in FIGS. 3-6. FIG. 3 shows data on the equipment of the layout objects, FIG. 4 shows data on connection of a nozzle of the equipment shown in FIG. 3, FIG. 5 shows data on the pipe of the layout objects, and FIG. 6 shows data on components of the pipe shown in FIG. 5.

The liquid discharger arrangement rule storage 7 stores arrangement rule for the liquid dischargers, that is, drains and vents. A liquid discharger arrangement rule is a rule which should be followed in arranging the drains and vents. An example of arrangement rules are shown in FIG. 7.

Figure 20:
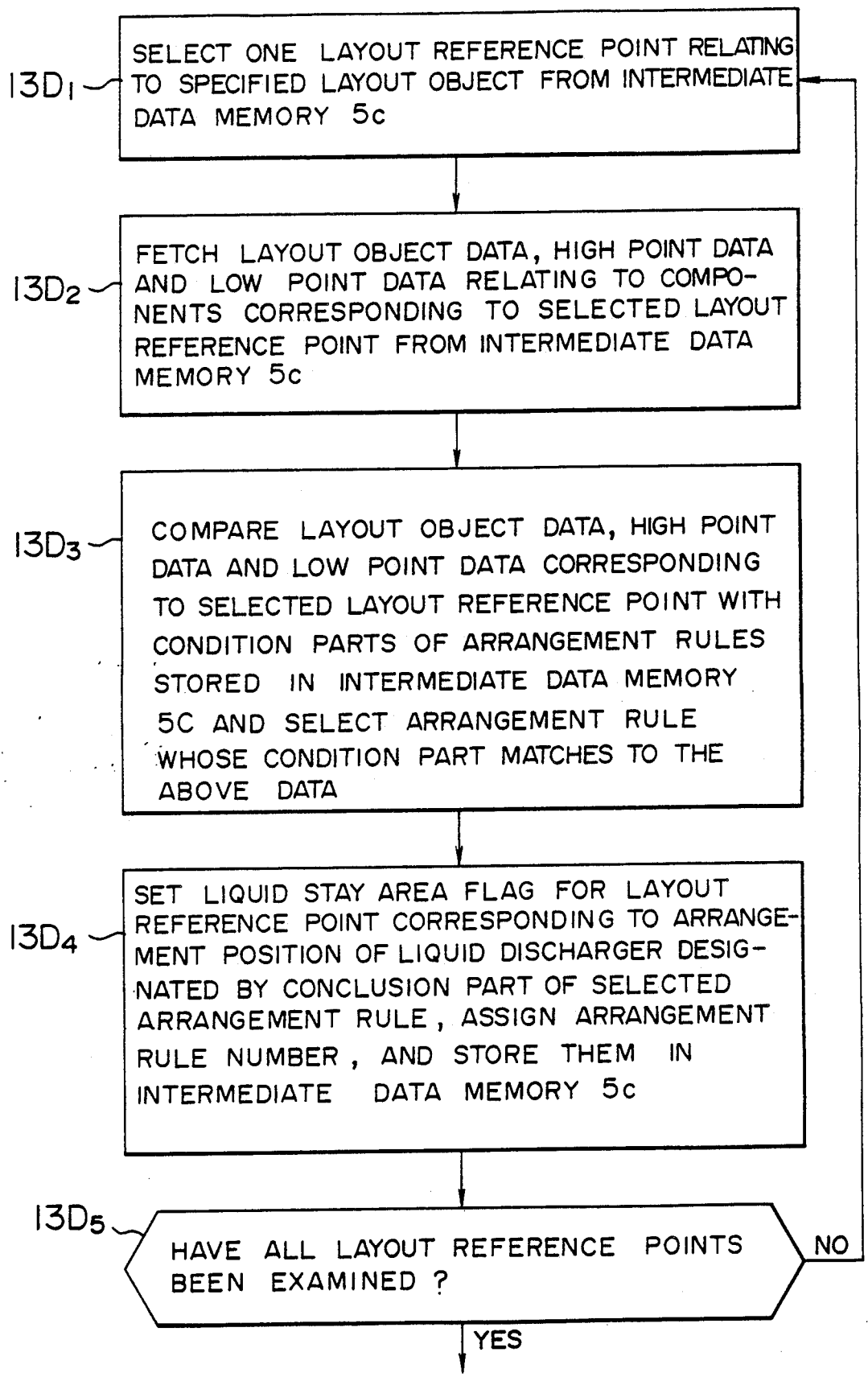
FIG. 20 shows a detailed process of a step 13D of FIG. 13.

The layout object image data storage 8 stores image data of the layout objects after the layout shown in FIG. 20 of JP-A-61-213969 (FIG. 18 of corresponding U.S. patent application Ser. No. 838,957 described above) or FIG. 23 of Japanese patent application No. 60-253767 (FIG. 24 of corresponding U.S. patent application Ser. No. 929,894 filed on Nov. 13, 1986).

The design attachment data storage (not shown) stores data on the design attachments as shown in FIG. 5 of Japanese patent application 60-253767 (FIG. 2 of U.S. patent application Ser. No. 929,894 described above).

The layout object data storage 6, liquid discharger arrangement rule storage 7, layout object image data storage 8 and design attachment data storage are external memories.

The process shown in FIG. 2 is now explained. The layout objects are laid out by the steps 9-14 of the design assistance apparatus of the Japanese patent application No. 60-253767 (corresponding U.S. patent application Ser. No. 929,894) or the steps 11-24 of the design assistance method of JP-A-61-213969. After the layout, the image data of the layout objects (for example, pipes) is stored in the layout object image data storage 8 together with the image data of equipments which are other layout objects arranged in the layout object area and the structures (for example, walls and posts of building) in the layout area. For example, the image data shown in FIG. 23 of the Japanese patent application No. 60-253767 is stored. The image data of FIG. 23 shows a layout of an overall floor of a nuclear reactor building, and one layout area corresponds to one floor. If it is too wide, the floor may be divided into a plurality of layout areas such as rooms and the image data may be stored for each narrower layout area.

A draft layout prepared by the description of pages 3 to 23 of the specification of the Japanese patent application No. 60-253767 (pages 6 to 23 of the specification of the U.S. patent application Ser. No. 929,894) is an initial draft layout which does not take into account the arrangement of liquid dischargers (drains and vents) in the liquid stay areas (for example, drain stay area and vent stay area) in the liquid path.

In laying out the liquid dischargers in the liquid stay area, the operator specifies a corresponding layout area by the input device 4. Thus, the process including the steps 10-17 of FIG. 2 stored in the process memory 5b is supplied to the processing circuit 5a, which executes the process.

Figure 8:
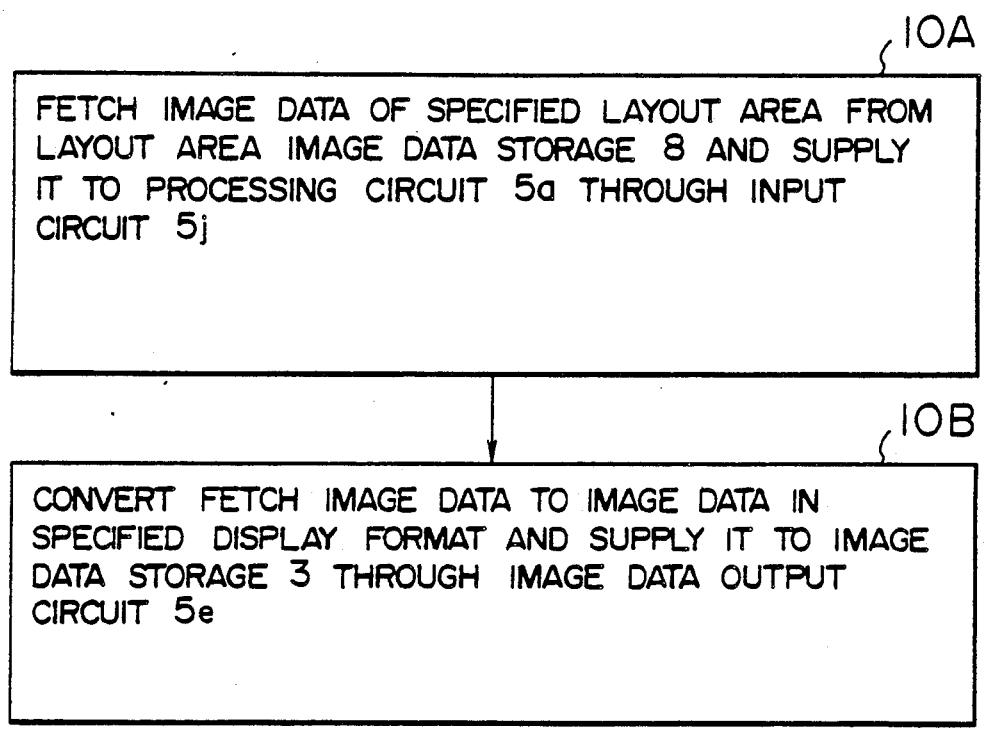
FIG. 8 shows a detailed process of a step 10 of FIG. 2, FIGS. 9 and 10 show layout area images displayed on a display device by the process of FIG. 8.
Figure 9:
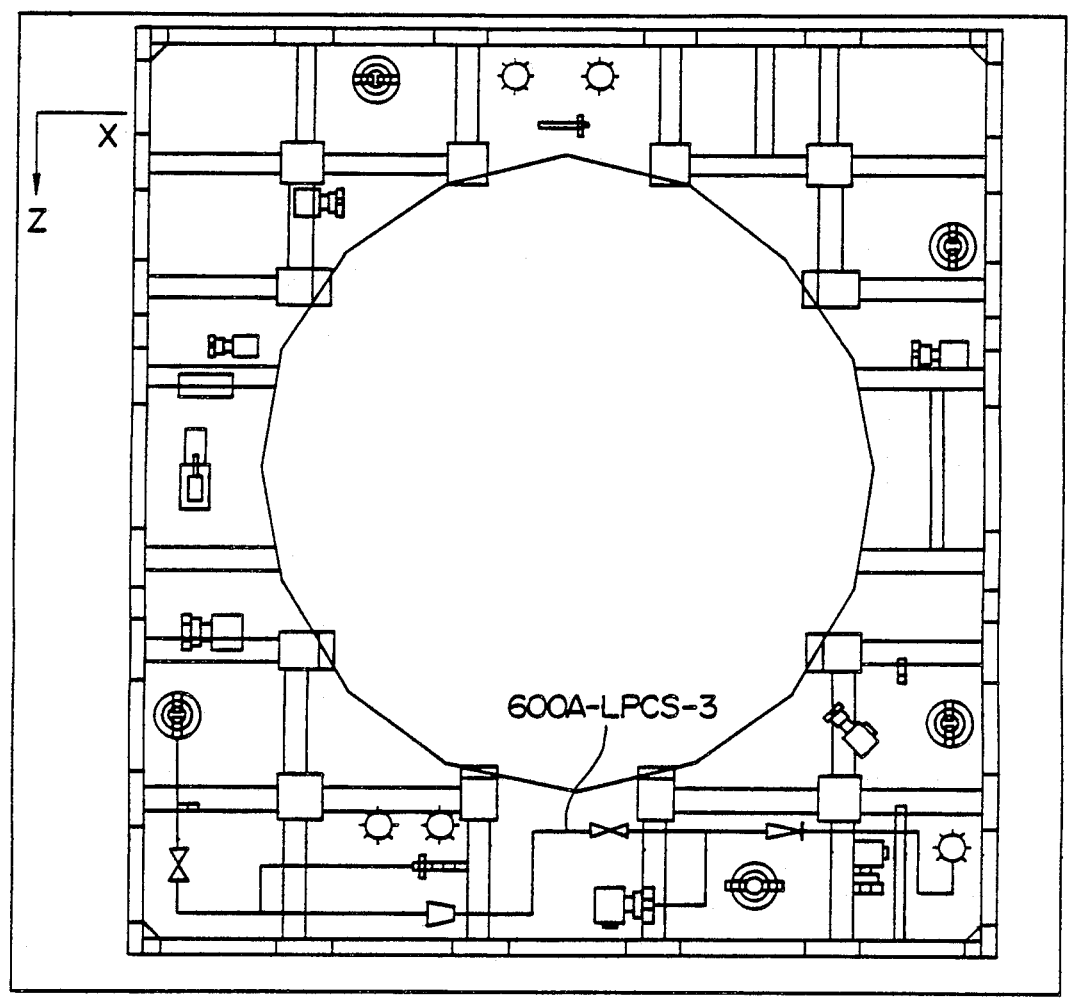

First, the image of the initial draft layout relating to the specified layout is displayed (step 10). FIG. 8 shows a detail of the step 10. In a step 10A, the image data relating to the specified layout area is retrieved from the layout area image data storage 8 and supplied to the processing circuit 5a through the input circuit 5j. The processing circuit 5a converts the fetched image data relating to the specified layout area to an image data of a representative format (third angle method or perspective method) specified by the operator through the input device 4 through input circuit 5d, and supplies it to the image data storage 3 through the image data output circuit 5e (step 10B). The conversion of the image data to the specified representation form is done in a manner shown in the steps of FIGS. 11A and 11B of JP-A-61-213969 (FIGS. 12A and 12B of the corresponding U.S. patent application Ser. No. 838,957). The image display control unit 2 reads the image data of the layout area stored in the image data storage 3 and displays it on the display device 1. FIG. 9 shows an example of displayed image. It shows an initial draft layout prepared by the process of the steps 9–14 described in the Japanese patent application No. 60-253767.

Figure 10:
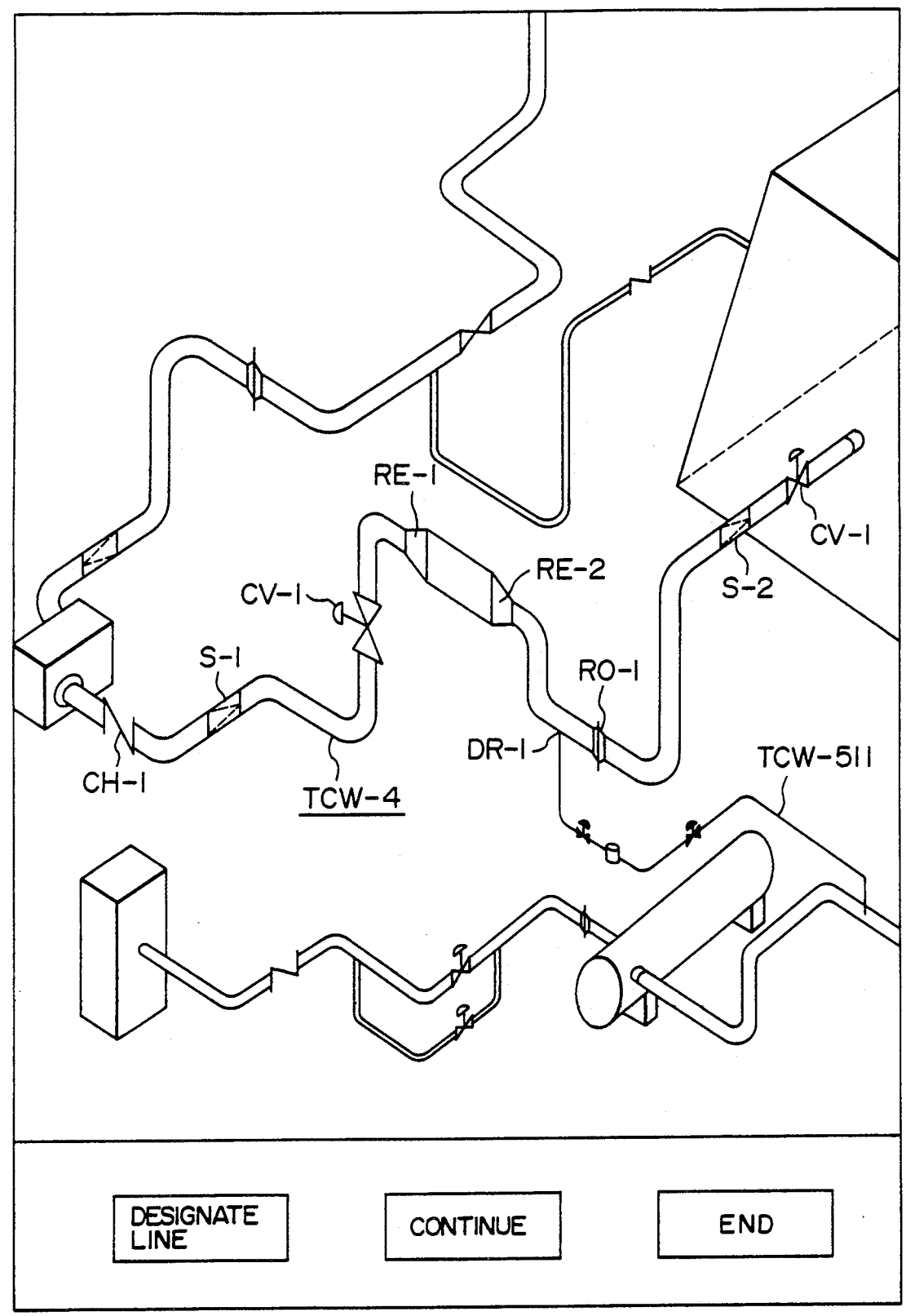

FIG. 10 also shows an image displayed on the display device 1 by the step 10, and it corresponds to a building code "HX-B" of a plant code "M 2" specified by the operator through the input device 4 (specified layout area). The image of FIG. 10 includes a code designated by a code "TCW-4", and a drain pipe designated by a code "TCW-511" connected to the pipe TCW-4 through a drain seat "DR-1". The image of FIG. 10 includes the image corresponding to the building code "HX/B" as well as an image of menu items "designate line", "continue" and "end".

The process of the step 11 et seq is explained with reference to the image of "HX/B" shown in FIG. 10.

Figure 11:
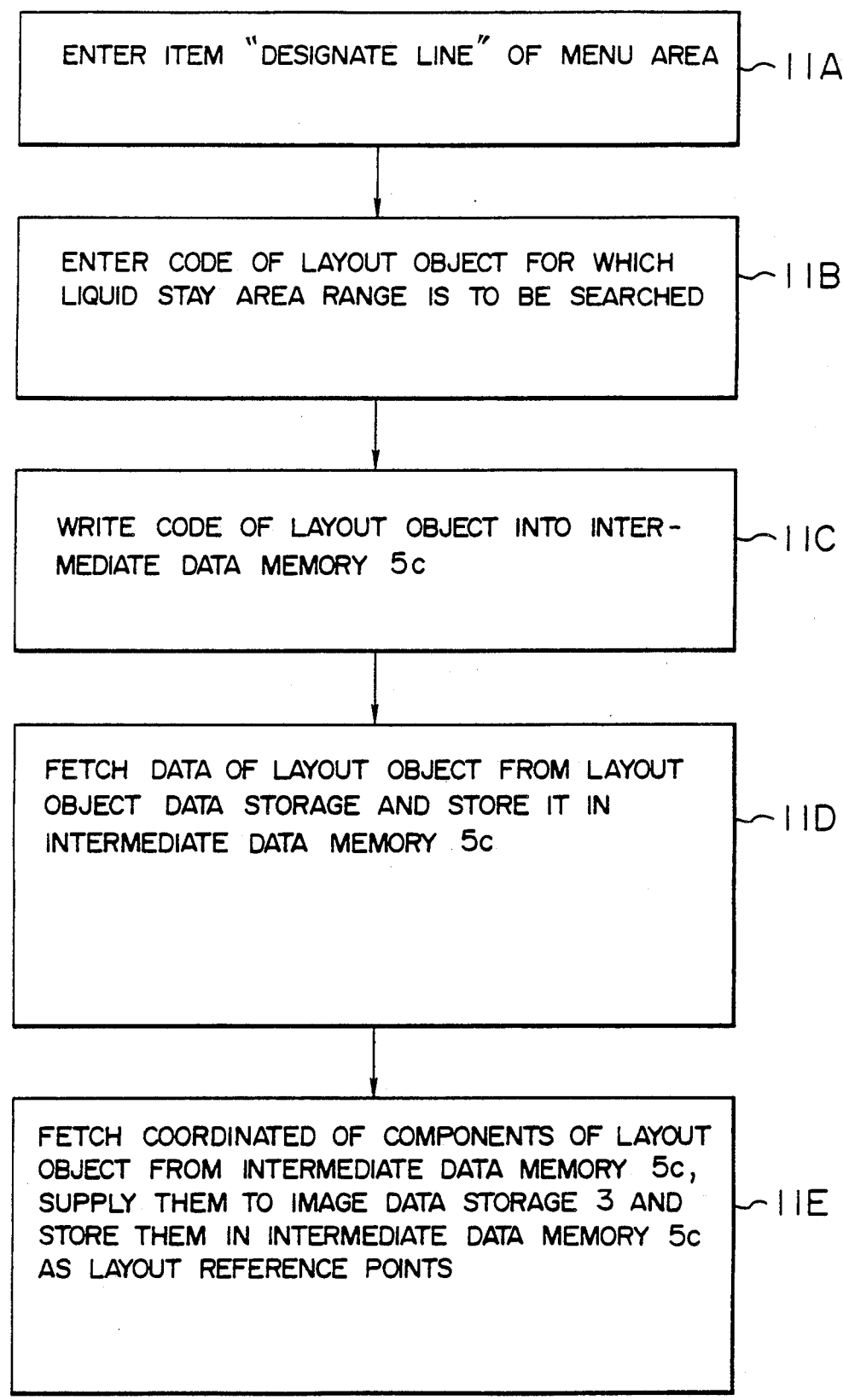
FIG. 11 shows a detailed process of a step 11 of FIG. 2.

The layout object which is in the layout area ("HX/B") displayed on the display device 1 and whose range of liquid stay area is to be searched is displayed (step 11). Detail of the step 11 is shown in FIG. 11.

The step 11 comprises steps 11A–11E. The signal "designate Line" of the menu area (of the image displayed on the display device 1 (FIG. 10)) designated by the operator through the input device 4 is supplied to the processing circuit 5a through the input circuit 5d (step 11A). The menu area is designated by a two-dimensional coordinate input device (not shown) such as joy stick or mouse provided in the input device 4 together with a keyboard. Then, the range of arrangement of the liquid dischargers (drains and vents), that is, the liquid stay area is searched. The operator specifies, through the input device 4, the name (code) of the layout object (for example, pipe) whose range of liquid stay area is to be searched. The code of the specified layout object is supplied to the processing circuit 5a through the input circuit 5d (step 11B). For example, it is assumed that the code "TCW-4" of the layout object is inputted. The code of the layout object is temporarily stored in the intermediate data memory 5c (step 11C). The layout object data corresponding to the layout object whose range of liquid stay area is to be searched is retrieved from the layout object data storage 6 (step 11D). The code of the specified layout object is sent to the layout object data storage 6 through the output circuit 5f, the layout object data corresponding to the layout object is retrieved, and the retrieved layout object data is supplied to the processing circuit 5a through the input circuit 5g and stored in the intermediate data memory 5c. The layout object data stored in the intermediate data memory 5c in the step 11D is shown in FIGS. 5 and 6. Then, a step 11E is executed. In the step 11E, the coordinates of arrangement of the components of the layout object are selected from the layout object data stored in the intermediate data memory 5c in the step 11D, and the coordinate data is supplied to the image data memory 3 through the image data output circuit 5e. The selected coordinates of arrangement of the components are reregistered into the intermediate data memory 5c as layout reference points of the components. The layout object data stored in the layout object data storage 6 (for example, data of coordinates of arrangement of the components of the layout object) has already been updated to correspond to the image data of the layout produced in the process of layout of the layout object executed prior to the step 10. Accordingly, at the end of the layout of the layout object, the layout object data stored in the layout object data storage 6 corresponds to the image data of the layout object stored in the layout object image data storage 8. In the present embodiment, the coordinates (X, Y, Z) of the components No. 1–No. 19 of FIG. 6 are stored in the intermediate data memory 5c as layout reference points of the components.

Figure 12:
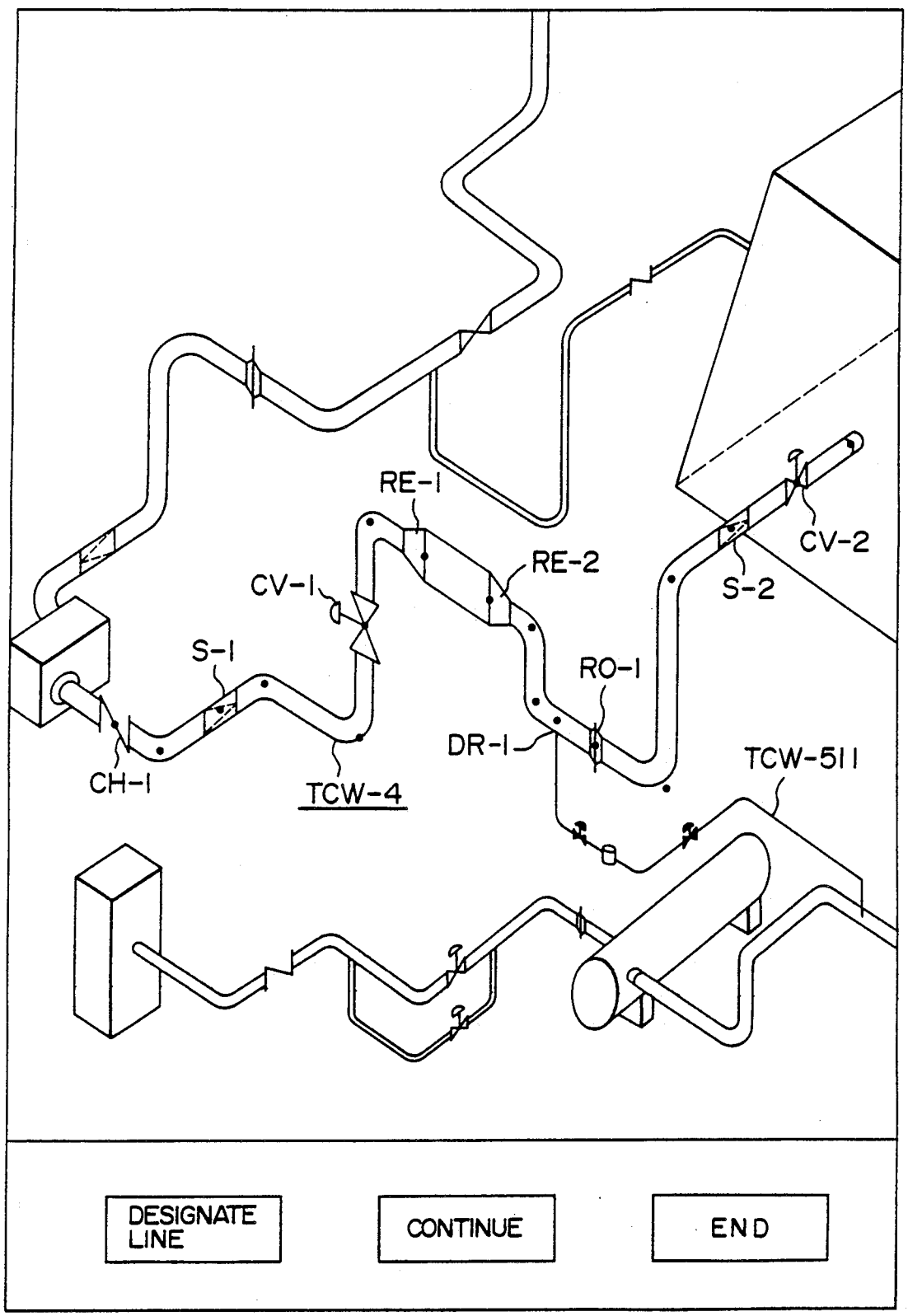
FIG. 12 shows an image produced in a step 11.

After the process of the step 11E, the coordinates of arrangement of the components of the layout object supplied to the image data storage 3 are displayed on the screen of the display device 1. The image displayed on the screen of the display device 1 is shown in FIG. 12, in which portions indicated by "." show the coordinates of arrangement of the components. In the present embodiment, an elbow is provided at a curve point of the pipe system. When the elbow is not used but the pipe is bent at the curve point, the curve point is considered as the component.

Thus, the step 11 is terminated and a step 12 is now started. The operator inputs, through the input device 4, layout type data indicating whether the layout image of the specified layout area has been newly prepared or not. The layout type data is stored in the intermediate data memory 5c. The step 12 may be executed between the steps 10 and 11. In the present embodiment, since the layout of FIG. 10 is modified one, the operator inputs "modified layout" as the layout type data. Accordingly, in the step 12, "modified layout" is stored in the intermediate data memory 5c at the address of the layout type data.

Figure 13:
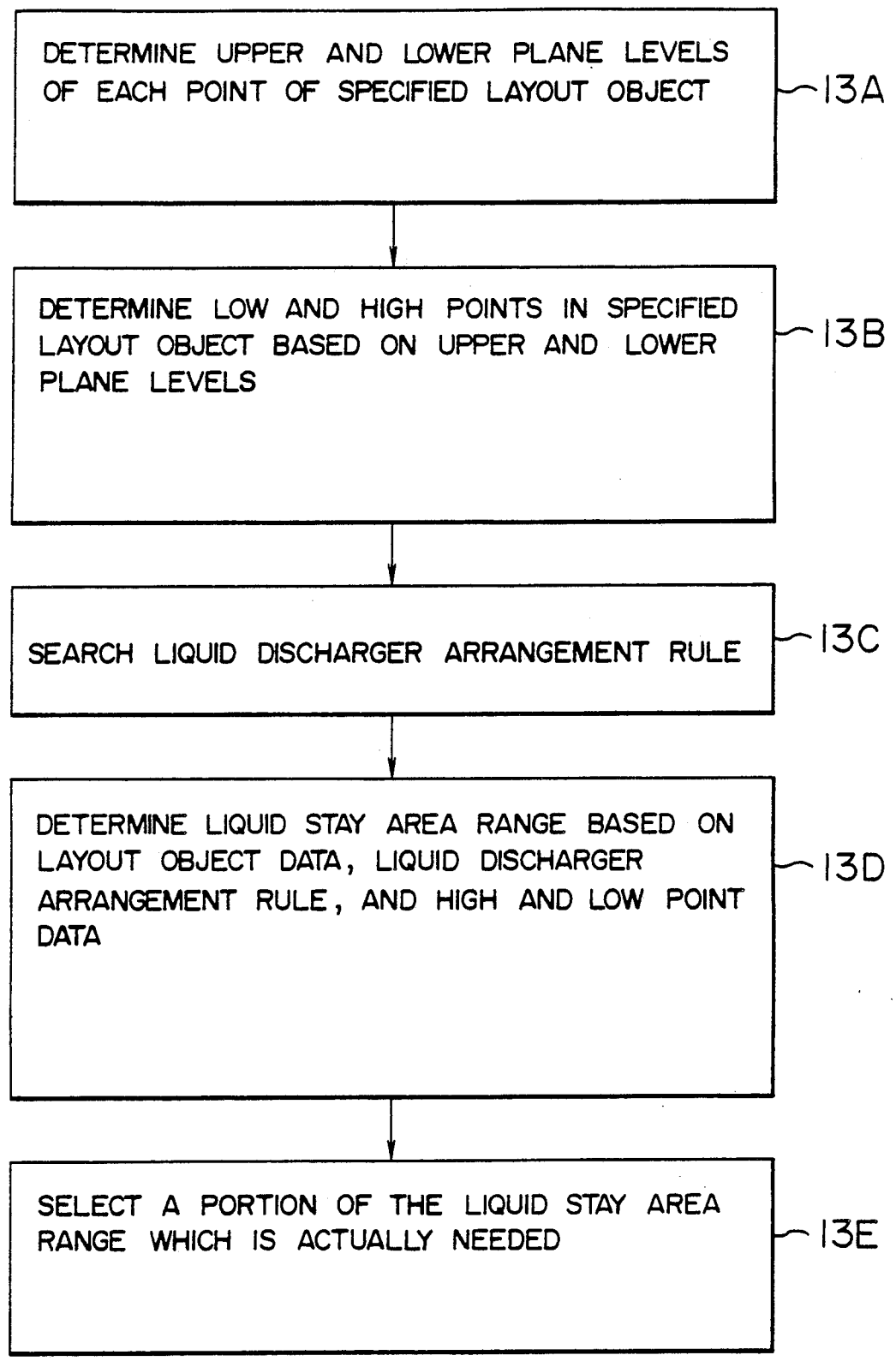
FIG. 13 shows a detailed process of a step 13 of FIG. 2.

After the step 12, the position of the liquid stay area in the specified layout object is determined (step 13). As shown in FIG. 13, the layout step 13 has step 13A (to determine upper and lower plane levels of the specified layout object), step 13B (to determine low point and high point in the specified layout object based on the upper and lower plane levels), step 13C (to retrieve the liquid discharger arrangement rule), step 13D (to determine a range of liquid stay area) and step 13E (to select that portion of the liquid stay area at which the liquid discharger is to be actually arranged).

Figure 14:
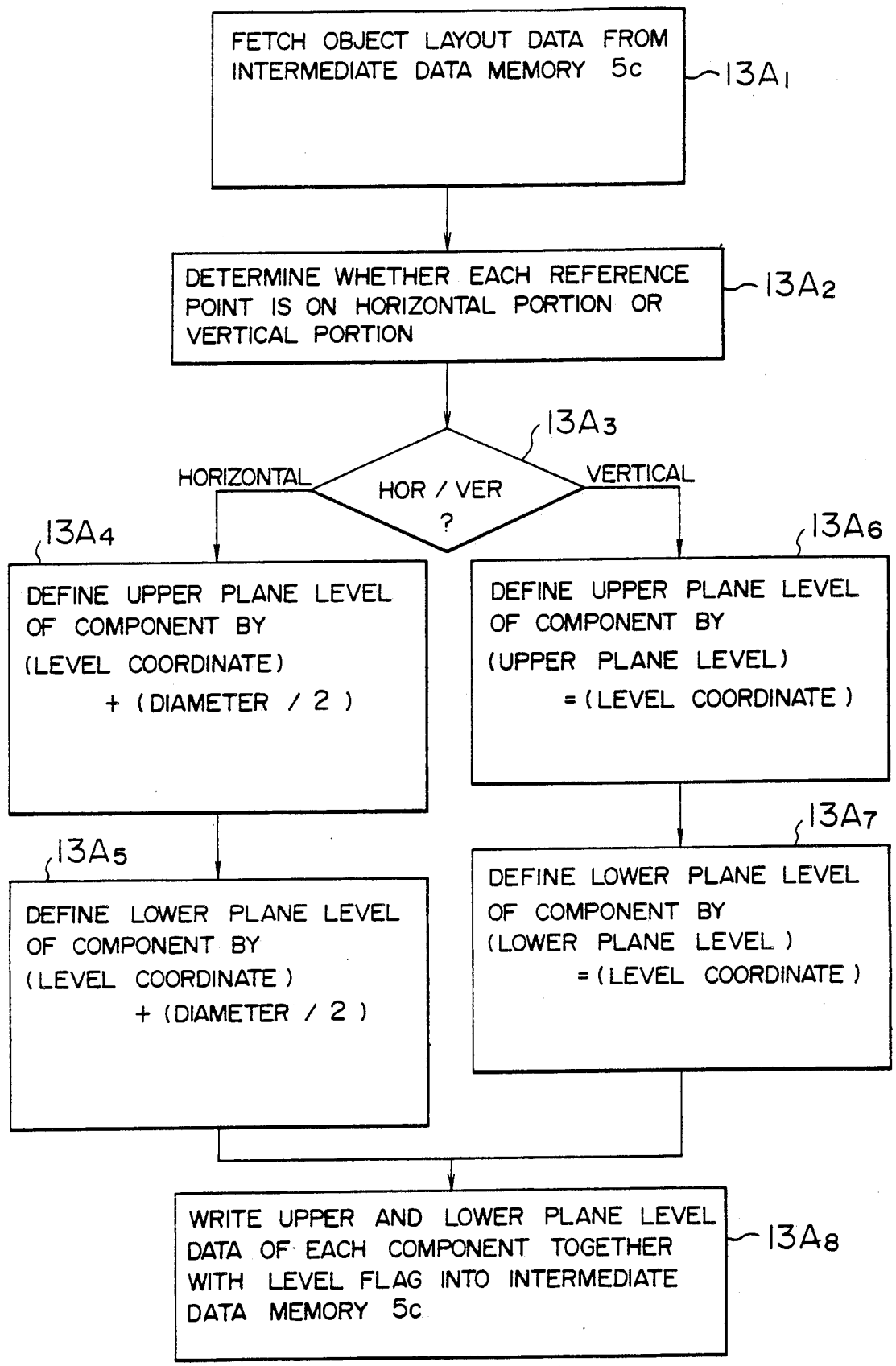
FIG. 14 shows a detailed process of a step 13A of FIG. 13.
Figure 16:
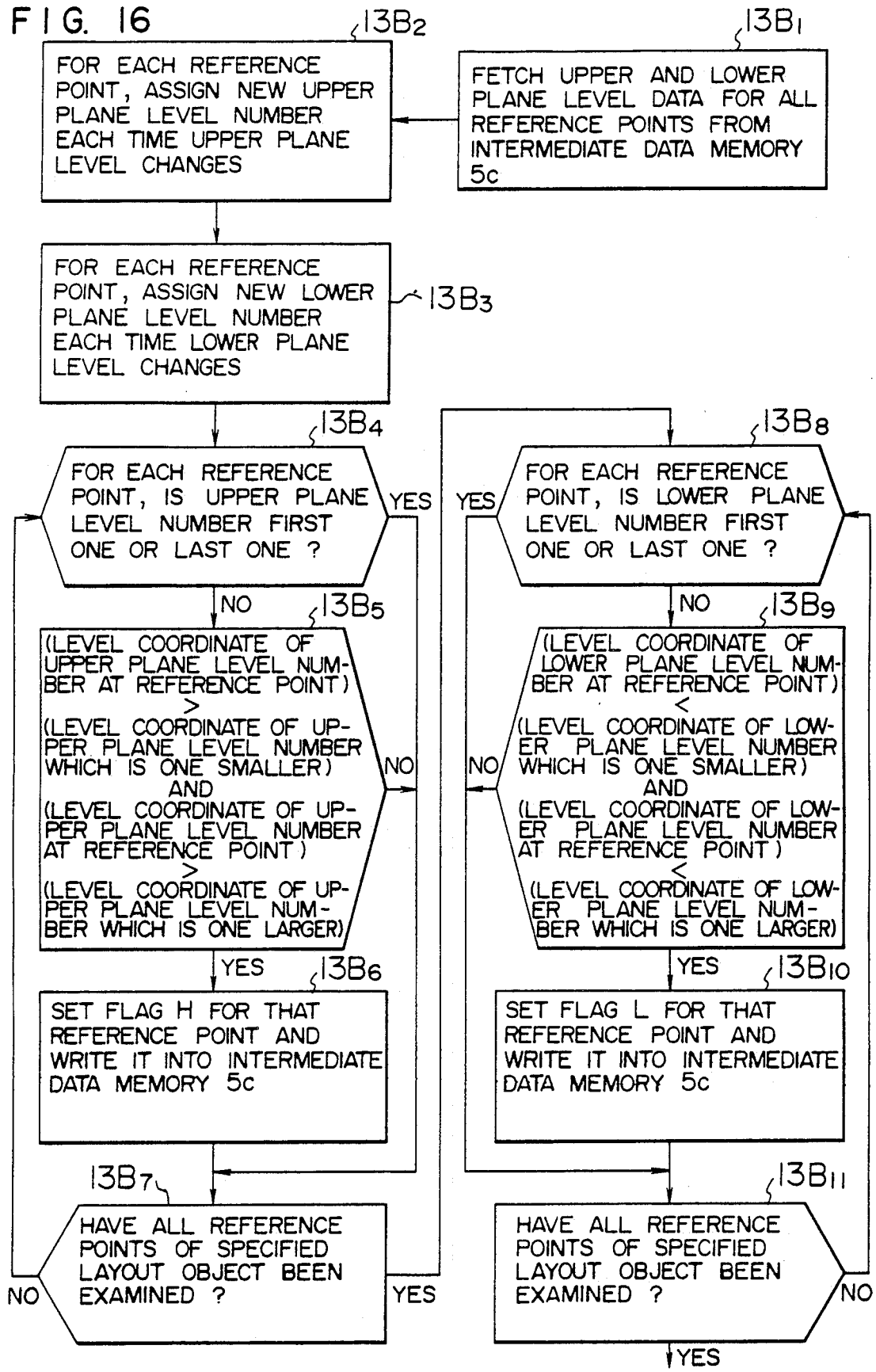
FIG. 16 shows a detailed process of a step 13B of FIG. 13.

The step 13A which is shown in FIG. 14 in detail is first executed. The step 13A includes steps $13A_1$–$13A_8$. The detail of the step 13A is explained below.

The layout object data of the specified layout object is fetched from the intermediate data memory 5c (step $13A_1$). Whether the layout reference point of each component of the specified layout object is positioned in a horizontal portion or a vertical portion of the specified layout object is determined based on the layout object data (step $13A_2$) The result is stored in the intermediate data memory 5c. The determination whether the layout reference point is positioned in the horizontal portion or vertical portion is done by comparison of the level coordinates of the layout reference point with the level coordinates of the layout reference points adjacently arranged thereto. If the level coordinates of the layout reference point are equal to the level coordinates of the latter layout reference point, the layout reference point is determined to be in the horizontal portion, and if the level coordinates are not equal, the layout reference point is determined to be in the vertical portion. In the present embodiment, assuming that the Z coordinate of FIG. 6 as the level coordinate, only the layout reference point No. 7 is in the vertical portion and other layout reference points are in the horizontal portion. A level flag SH is set for the layout reference point in the horizontal portion, and a level flag SC is set for the layout reference point in the vertical portion (FIG. 15).

In a step $13A_3$, whether the layout reference point is positioned in the horizontal portion or vertical portion is checked. For the layout reference points which are in the horizontal portion, steps $13A_4$ and $13A_5$ are executed, and for the layout reference points in the vertical portion, steps $13A_6$ and $13A_7$ are executed. When the layout reference point is in the horizontal portion, the upper plane level of the component at the layout reference point is defined by:

(upper plane level) = (level coordinates) + (diameter)/2

(step $13A_4$), and the lower plane level of the component is defined by:

(lower plane level) = (level coordinates) − (diameter)/2

(step $13A_5$) If the layout reference point is in the vertical portion, the upper plane level of the component at the layout reference point is defined by:

(upper plane level) = (level coordinates)

(step $13A_6$), and the lower plane level of the component is defined by (lower plane level) = (level coordinates)

(step $13A_7$) For example, the layout reference point No. 4 of FIG. 6 is in the horizontal portion and the level coordinate is "−11000" and a diameter of a straighter S-1 at the reference point is "600" as shown in FIG. 5. Thus, the upper and lower plane levels of the component or straighter S-1 are defined by:

upper plane level $(Z_1) = -11000 + 600/2 = -10700$ lower plane level $(Z_2) = -11000 - 600/2 = -11300$ The layout reference point No. 7 of FIG. 6 is in the vertical portion and the level coordinate is "−7450" and the diameter of a control valve CV-1 at the reference point is "600". Thus, the upper and lower plane levels of the component or control valve CV-1 are defined by:

upper plane level $(Z_1) = -7450$ lover plane level $(Z_2) = -7450$

The upper and lower plane levels of the components determined in the steps $13A_4$–$13A_7$ and the level flags of the layout reference points determined in the step $13A_2$ are stored in the intermediate data memory $5c$ (step $13A_8$) The content of the intermediate data memory $5c$ in the step $13A_8$ is shown in FIG. 15. The diameter described above means an outer diameter. If an inner diameter of the component is used as the diameter, the upper and lower plane levels can be more precisely determined. The inner diameter is determined by subtracting a thickness from the outer diameter.

In a step 13B, low point and high point in the specified layout object are determined based on the upper and lower plane levels determined in the step 13A. The step 13B comprises 11 steps $13B_1$–$13B_{11}$.

The level coordinates $(Z_1, Z_2)$ of the upper and lower plane levels of the components of the specified layout object stored in the step $13A_8$ are fetched from the intermediate data memory $5c$. For the layout reference point of each component, a new upper level number is assigned each time the level coordinate $(Z_1)$ of the upper level changes (step $13B_2$) For example, for the layout reference points No. 1–No. 6, $Z_1 = -10700$ and the upper level numbers for those layout reference points are "1". For the layout reference point No. 7, $Z_1 = -7450$ and the upper level number for this layout reference point is "2". For the layout reference point No. 8, $Z_1 = -5300$ and the upper plane level number for this layout reference point is "3". For the layout reference points No. 9 and No. 10, $Z_1 = -5200$ and the upper plane level numbers for those layout reference points are "4". In a step $13B_3$, a new lower plane level number is assigned to the layout reference point of each component each time the lower level coordinate $(Z_2)$ changes, in the same manner as the step $13B_2$. In the steps $13B_2$ and $13B_3$, the resulting upper and lower plane level numbers are stored in the intermediate data memory $5c$. FIG. 17 shows a content of the memory $5c$.

In a step $13B_4$, whether the upper plane level number assigned to the layout reference point is first or last number in the specified layout object or not is determined. If the upper plane level number is the first or last number, the high point flag H is not set and the steps $13B_5$ and $13B_6$ are skipped and the step $13B_7$ is executed. For example, the layout reference point No. 2 has the upper plane level number "1" which is the first upper plane level number, and the layout reference point No. 16 has the upper plane level number "7" which is the last level number. For those layout reference points, the steps $13B_5$ and $13B_6$ are not executed and the step $13B_7$ is executed. If the upper plane level number is not the first or last number, the steps $13B_5$–$13B_7$ are sequentially executed.

In the step $13B_5$, whether the following two logical expressions (1) and (2) are met or not for each layout reference point is determined. The upper level of the layout reference point which meet the expressions (1) and (2) is the high point. If it does not meet the logical expressions, the step $13B_6$ is executed.

(level coordinate corresponding to the upper plane level number of one layout reference point) > (level coordinate corresponding to the upper plane level number which is one smaller than said upper plane level number)  (1)

(level coordinate corresponding to the upper plane level number of one layout reference point) > (level coordinate corresponding to the upper plane level number which is one larger than said upper  (2)

plane level number)

For example, for the layout reference point No. 9, the upper plane level number is "4" and the level coordinate is "−5200", the level coordinate at the upper plane level number "3" which is one smaller is "−5300", and the level coordinate at the upper plane level number "5" which is one larger is "−5300". Accordingly, −5200 > −7450 and −5200 > −5300 and the expressions (1) and (2) are met. Thus, the upper plane level at the layout reference point No. 9 is the high point. For the layout reference point No. 11, the upper plane level number is "5" and the level coordinate is "−5300", the level coordinate at the upper plane level number "4" which is one smaller is "−5200", and the level coordinate at the upper plane level number "6" which is one larger is "−6900". Accordingly, −5300 > −6900 and −5300 < −5200 (not −5300 > −5200), and the upper plane level of the layout reference point No. 11 is not the high point.

In the step $13B_5$, a high point flag H is set for the layout reference point having the upper plane level which meets the expressions (1) and (2), and it is stored in the intermediate data storage $5c$ (step $13B_6$) In the step $13B_7$, whether all layout reference points in the specified layout object have been checked or not is determined. If all layout reference points have not been checked, the step $13B_4$ is executed for the remaining layout reference points. When all layout reference points have been checked, the step $13B_8$ is executed.

In the step $13B_8$, the upper plane level in the step $13B_4$ is merely replaced by the lower plane level and the process is essentially identical to the step $13B_4$. Whether the lower plane level number assigned to the layout reference point is first or last number in the specified layout object or not is checked. For the layout reference point whose lower plane level number is first or last number, the step $13B_{11}$ is executed. For example, for the layout reference points No. 2 and No. 16, the steps $13B_9$ and $13B_{10}$ are not executed and the step $13B_{11}$ is executed.

For the layout reference point for which the step $13B_8$ decides that the lower plane level number does not correspond to the first or last lower plane level number, the steps $13B_9$–$13B_{11}$ are executed. In the step $13B_9$, whether the following two logical expressions (3) and (4) are met for the layout reference point or not is determined. The low plane level at the layout reference point which meets the expressions (3) and (4) is a low point. When those expressions are not met, the step $13B_{11}$ is executed.

| (level coordinate corresponding to lower plane level number at one layout reference point) | > | (level coordinate corresponding to the lower plane level number which is one smaller than said lower plane level number) | (3) |
|---|---|---|---|
| (level coordinate corresponding to lower plane level number at one layout reference point) | > | (level coordinate corresponding to the lower plane level number which is one larger than said lower plane level number) | (4) |

For example, for the layout reference point No. 8, the lower plane level number is "3" and the level coordinate is "−5900", the level coordinate at the lower plane level No. 2 which is one smaller is "−7450", and the level coordinate at the lower plane level No. 4 which is one large is "−6000". Accordingly, NOT (−5900 < −7450) and NOT (−5900 < −6000), and the lower plane level of the layout reference point No. 8 is not the low point. For the layout reference point No. 14, the lower plane level number is "6" and the level coordinate is "−7500", the level coordinate at the lower plane level No. 5 which is one smaller is "−5900", and the level coordinate at the lower plane level No. 7 which is one larger is "−3500". Accordingly, (−7500 < −5900) and (−7500 < −3500), and both the expressions (3) and (4) are met and the lower plane level of the layout reference point 14 is the low point.

In the step $13B_9$, a low point flag L is set for the layout reference point having the lower plane level which meets the expressions (3) and (4), and it is stored in the intermediate data storage $5c$ (step $13B_{10}$) In the step $13B_{11}$, whether all layout reference points of the specified layout object have been checked or not is examined. If all layout reference points have not been checked, the step $13B_8$ is executed, and if all layout reference points have been checked, a new step 13C is executed. FIG. 18 shows a content of the intermediate data memory $5c$ relating to the high point H and the low point L at the end of the step $13B_{10}$.

Figure 19:
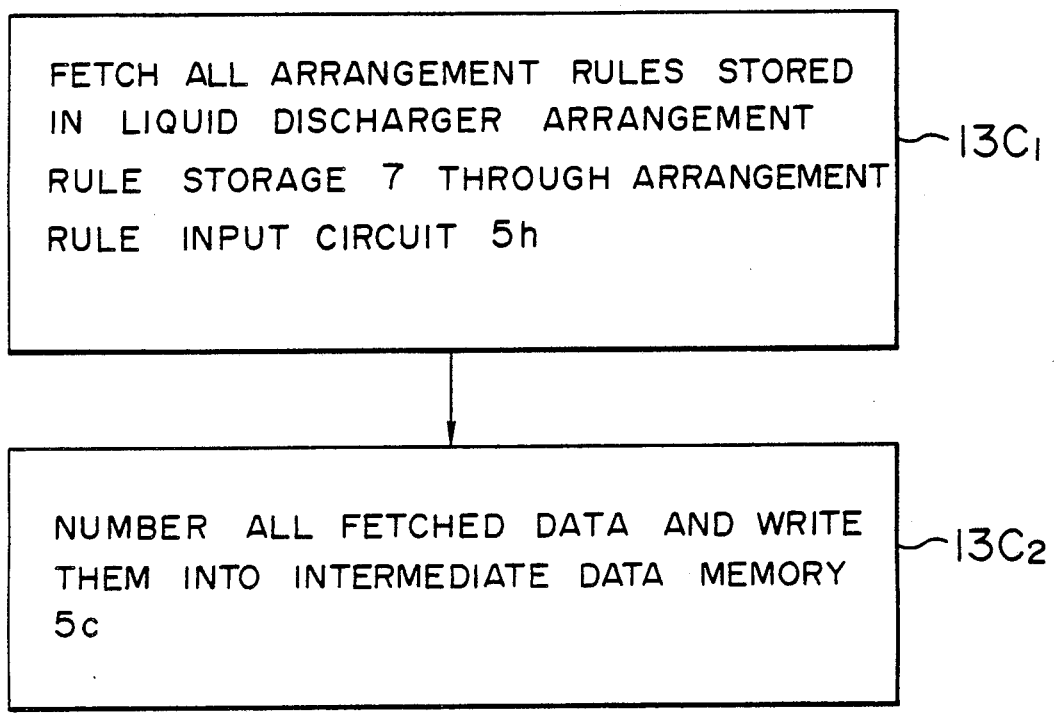
FIG. 19 shows a detailed process of a step 13C of FIG. 13.

A detail of the step 13C is explained with reference to FIG. 19.

The liquid discharger arrangement rule stored in the liquid discharger arrangement rule storage 7 is fetched and it is supplied to the liquid discharger arrangement rule input circuit $5h$ (step $13C_1$). Then, the liquid discharger arrangement rule is numbered and written into the intermediate data memory $5c$ (step $13C_2$). The liquid discharger arrangement rules shown in FIGS. 7a–7d are stored in the intermediate data memory $5c$. The liquid discharger arrangement rules require the arrangement of the liquid dischargers such as drains or vents at positions of the liquid stay areas such as drain stay areas or vent stay areas in designing the system of the layout object. In the present embodiment, the vent stay area is an air stay area. A drain pipe is arranged at the drain area, and a vent pipe (air vent pipe) is arranged at the vent area.

After the step 13C has been executed, a step 13D is executed. The step 13D comprises steps $13D_1$–$13D_5$.

One of the layout reference points in the specified layout object is selected from the intermediate data memory $5c$ (step $13D_1$). Then, the layout object data and the high and low point data for the components of the selected layout reference point are fetched from the intermediate data memory $5c$ (step $13D_2$). The corresponding liquid discharger arrangement rule is selected from the intermediate data memory $5c$ based on the layout object data and high and low point data of the selected layout reference point (step $13D_3$). Whether the data in the condition part of the liquid discharger arrangement rule stored in the intermediate data memory $5c$ are included in the data corresponding to said layout reference point or not is checked. If the data in the condition part are in the data corresponding to said layout reference point, the liquid discharger arrangement rule having that condition part is selected. Then, a step $13D_4$ is executed. In the step $13D_4$, a liquid stay area flag is set for the layout reference point of the portion corresponding to the arrangement position of the liquid discharger shown in a conclusion part of the selected liquid discharger arrangement rule, and a liquid discharger arrangement rule number is assigned, and they are stored in the intermediate data memory $5c$. The liquid stay area flag is set and the corresponding liquid discharger arrangement rule number is assigned at the layout reference point selected in the step $13D_1$ if the liquid discharger shown in the conclusion part is arranged at that layout reference point, at an upstream layout reference point if it is upstream of the reference point, and a downstream layout reference point if it is downstream of the reference point. Then, the resulting data is stored in the intermediate data memory $5c$ together with the layout reference point. In a step $13D_5$, whether the above process has been executed for all layout reference points of the specified layout object or not is examined. If there is a layout reference point which has not been processed, the steps $13D_1$–$13D_5$ are repeated. After the steps $13D_1$–$13D_4$ have been executed for all layout reference points, the process proceeds to a step 13E. The liquid stay area flag set in the step $13D_4$ is D for the drain stay area at which a drain is to be arranged, and V for the vent stay area (air stay area) at which an air vent is to be arranged.

The steps $13D_3$ and $13D_4$ are explained with reference to the pipe system TCW-4.

At the layout reference point No. 2, the component is CH-1 and the type is a check value, and the upstream is a pump as seen from FIGS. 5 and 6. The level coordinate of its lower plane level number (No. 1, $-11300$) is lower than that of the next level number (No. 2, $-7450$) as seen from FIG. 17, so that downstream is a rising pipe, as seen from FIGS. 5 and 6. Accordingly, the data at the reference point correspond to the three data (speciality; check valve, upstream; pump, downstream; rising) of the condition part of the liquid discharger arrangement rule of No. 15 in FIG. 7d. Accordingly, for the layout reference point No. 2, the liquid discharger arrangement rule No. 15 is selected. In the data of the conclusion part of the arrangement rule, the liquid discharger is arranged downstream and the object is a drain. Accordingly, the drain stay area flags D and the corresponding liquid discharger arrangement rule number 15 are set to all layout reference points downstream of the layout reference point No. 2 (up to the next rising pipe, that is, the point of the level flag V, or No. 2-No. 6). At the layout reference point No. 9, the liquid name of the name code TCW-4 is a liquid and the diameter is 600 as seen from FIG. 5, and it is the low point/high point (FIG. 18), it matches to the data of the condition part of the liquid discharger arrangement rules No. 1 and No. 2 of FIGS. 7a and 7b respectively. In the conclusion part of the arrangement rule, the arrangement is at the corresponding point and the object is a vent in the arrangement rule No. 1, and the arrangement is the corresponding point and the object is a drain in the arrangement rule No. 2. Accordingly, the drain stay area flag D, the corresponding liquid discharger arrangement rule No. 2, the vent stay area flag V and the corresponding liquid discharger arrangement rule No. 1 are set only for the layout reference point No. 9. If there are a plurality of applicable liquid discharger arrangement rules, the liquid discharger arrangement rule number is sequentially incremented while the flags of the liquid stay areas such as drain stay area and vent stay area are kept as they are. FIG. 21 shows a content of the data in the intermediate data memory $5c$ produced in the step 13D. The liquid discharger arrangement rule storage 7 is an intelligence data base which stores the liquid discharger arrangement rules shown in FIGS. 7a–7d. The arrangement rule corresponding to each of the liquid discharger arrangement rule numbers of FIGS. 7a–7d is of IF-THEN type having an IF part (condition part) and a THEN part (conclusion part). In the liquid discharger arrangement rules shown in FIG. 7, the underscored portion is the IF part and the non-underscored portion is the THEN part.

A step 13E which is executed following to the step 13D is explained. In the step 13E, those liquid stay areas determined in the step 13D in which the liquid dischargers should be arranged are selected The step 13E comprises steps $13E_1$–$13E_3$ as shown in FIG. 22.

In the step $13E_1$, the data relating to the liquid stay area corresponding to the specified layout object is fetched from the intermediate data memory $5c$. The layout reference points are divided into groups each having serial liquid discharger arrangement rule numbers, one liquid discharger is arranged in each group, and the liquid discharger arrangement rule applicable to the arrangement range is set (step $13E_2$) In each group, the layout reference point numbers are arranged in an ascending order, and the arrangement range is represented by the first and last layout reference point numbers in the group. For example, in FIG. 21, the layout reference points No. 1–No. 4 form one group (to which the liquid discharger arrangement rule No. 20 is applicable) for the drain stay area, the layout reference points No. 16 and No. 17 form another group, and the layout reference points No. 2–No. 6 form other group for the arrangement rule No. 15. FIG. 23 shows grouping of the layout reference points at the end of the step $13E_2$, and shows a range of the liquid stay area in which each group arranges the corresponding liquid discharger. In FIG. 23, the figures at the start and end points indicate the layout reference point numbers.

After the step $13E_2$, a step $13E_3$ is executed. The portion of the liquid stay area in the specified layout object set in the step $13E_2$ in which the liquid discharger should be arranged is selected and stored in the intermediate data memory $5c$. In other words, the portion of the liquid discharge area in which the liquid discharger need not be arranged is selected. Specifically, for those partially overlapping liquid stay areas in the liquid discharge stay areas corresponding to the liquid discharger arrangement rules, the overlapping portions are taken out and set as new liquid discharge areas in which the liquid dischargers are to be arranged. The portions excluding the overlapping portions of the liquid stay areas corresponding to the overlapping liquid discharger arrangement rules are excluded from the range in which the liquid dischargers are to be arranged. The liquid stay area which was newly set in the step $13E_3$ to arrange the liquid discharger is stored in the intermediate data memory $5c$. In FIG. 23, the group of layout reference points No. 1–No. 4 for the liquid discharger arrangement rule number 20 and the group of layout reference points No. 2–No. 6 for the liquid discharger arrangement rule number 15 are partially overlapped. Thus, in the step $13E_2$, the overlapping range of the layout reference points No. 2–No. 4 is selected and stored in the intermediate data memory $5c$ as a new liquid stay area. The content of the memory is shown in FIGS. 24A and 24B.

Thus, the process of the step 13 is completed. The step 13 comprises a first portion (steps 13A and 13B) for determining a low point and a high point in the specified layout object based on the layout object data while taking a level difference between components into account, a second portion (steps 13C and 13D) for determining all liquid stay areas in the specified layout object based on the liquid discharger arrangement rule, and a third portion (step 13E) for selecting a portion of the liquid stay area in the specified layout object in which the liquid discharger should be arranged. The low point in the specified layout object determined in the first portion is a drain stay area, and the high point is a vent stay area. In this manner, the liquid stay area in the specified layout object can be set only by the first portion of the process. However, to compare with a case where the second portion is also used, the liquid stay area is not perfect and the precision thereof is lower if only the first portion of the process is used. In the second portion of the process, the liquid discharger arrangement rule is taken into consideration and hence the liquid stay area which could not be determined merely by the first portion can be set, and the precision is significantly improved. In the third portion of the process, the portion of the liquid stay area in which the liquid discharger should be arranged is selected and the number of liquid dischargers or liquid discharge paths arranged is reduced. Accordingly, a plant configuration can be simplified when a plant is assembled.

A step 14 which is executed following to the step 13 is explained. In the step 14, whether the layout configuration in which the liquid dischargers are to be arranged, for example, the layout of the specified layout area is new or not is examined. If it is new, a step 16 is executed, and if it is not new, a step 15 is executed. In the present embodiment, "modified layout" was entered in the step 12. Accordingly, the step 14 and the step 15 are executed in sequence.

Figure 25:
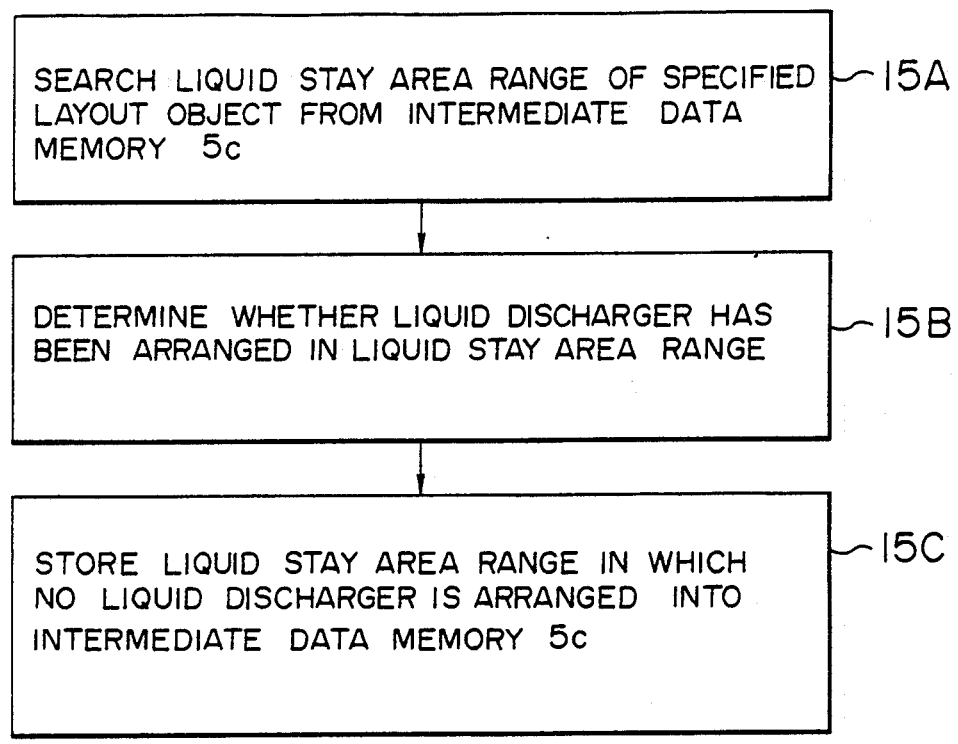
FIG. 25 shows a detailed process of a step of FIG. 2.
Figure 26:
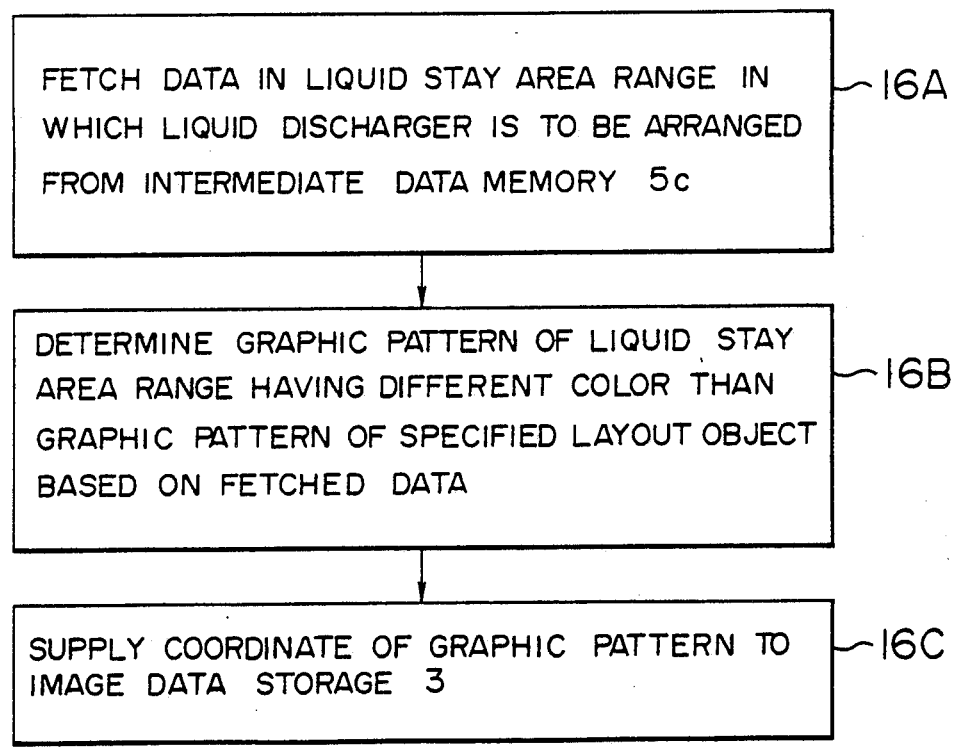
FIG. 26 shows a detailed process of a step of FIG. 2.

In the step 15, the portion of the liquid stay area determined for the specified layout object in which the liquid discharger has not been arranged is determined. A detail of the step 15 is shown in FIG. 25. In a step 15A, the liquid stay area of the specified layout object determined in the step 13 is fetched from the intermediate data memory 5c. In the following step 15B, whether the liquid discharger has been arranged in the liquid stay area or not is examined. The layout object data of the specified layout object is fetched from the intermediate data memory 5c, and whether the data includes data representing the arrangement of the liquid discharger in the liquid stay area or not is examined. In a step 15C, the liquid stay area in which the liquid discharger is not arranged, as determined in the step 15B, is stored in the intermediate data memory 5c. Specifically, in the specified layout object TCW-4, only the drain seat at the layout reference point No. 13 indicates the arrangement of the liquid discharger, as seen from the layout object data of FIG. 6. Accordingly, of the range shown in FIG. 24, the liquid stay area range excluding the liquid stay area range of the layout reference points No. 12–No. 15, which includes the layout reference point No. 13, is stored in the intermediate data memory 5c. The stored range is a final liquid stay area range in which the liquid discharger should be arranged. If "new layout" is entered in the step 12, the liquid stay area range stored in the step 13E$_3$ is the range in which the liquid discharger is to be arranged.

Figure 27:
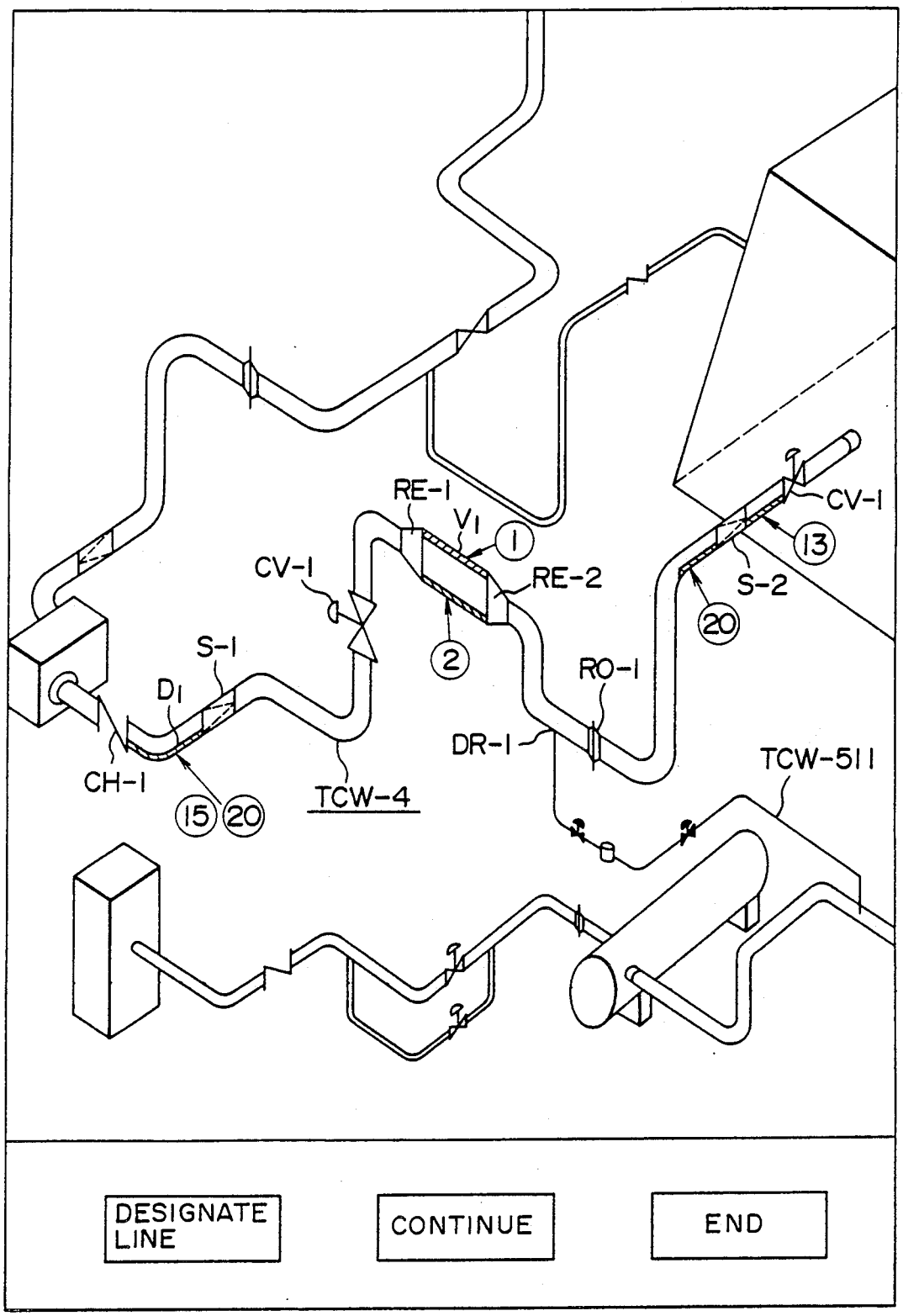
FIG. 27 shows an image produced at the end of the step 16 of FIG. 2.

The liquid stay area range in which the liquid discharger is to be arranged is displayed on the display device 1. This is done in a step 16. First, the data of the liquid stay area range in which the liquid discharger is to be arranged is fetched from the intermediate data memory 5c (step 16A). In the step 16A, the liquid discharger arrangement rule for the liquid stay area range is also fetched from the memory 5c. In the present embodiment, the data of the liquid stay area range is one relating to the drain stay area range and the air vent area range, and the data shown in FIG. 24 is fetched. Based on this data, a graphic pattern corresponding to the liquid stay area range and has a different color from that of the specified layout object is determined (step 16B). This graphic pattern may have a plane, or a straight line or curve. In the present step, the coordinates of the graphic pattern of the liquid stay area range is determined based on the data shown in FIG. 24. The resulting graphic data is supplied to the image data storage 3 for display on the display unit 1 through the image data output circuit 5e together with the arrangement rule fetched in the step 16A (step 16C). The image display control unit 2 sends the graphic data of the liquid stay area range stored in the image data storage 3 to the display unit 1 and displays the graphic pattern of the liquid stay area together with the graphic pattern of the system configuration of the specified layout object (FIG. 10) which is being displayed. The arrangement rule corresponding to the liquid stay area is also displayed. The image displayed on the display device 1 is shown in FIG. 27. In FIG. 27, $V_1$ denotes a vent stay area, $D_1$ denotes a drain stay area and circled numerals indicate the corresponding liquid discharger arrangement rules. In the step 16B, when the data of the graphic pattern of the liquid stay area range is to be determined, the following process is desirable. The graphic data is prepared such that the color of the graphic pattern representing the liquid stay area range is different from the color of the graphic pattern of the specified layout object which has been laid out, and the graphic data is also prepared such that the color of the graphic pattern is varied for each type of liquid stay area range (e.g. vent stay area or drain stay area). By preparing such graphic data, the operator can readily identify the liquid stay area range and the type thereof by watching the image displayed on the display device. As an alternative method of displaying the liquid stay area range, the brightness of the range or the width of the line may be changed from that of the layout object.

Finally, in a step 17 of the present embodiment, whether the range in which the liquid discharger of the layout object is to be arranged is to be checked or not is examined. If it is to be checked, the item "continue" in the menu area in the image (FIG. 27) displayed on the display device 1 is designated by the input device 4. Thus, the process of the step 11 et seq is repeated. If the check is not to be done, the item "end" of the menu area in the image of FIG. 27 is designated by the input device 4. Thus, the entire process is terminated.

After the steps 10–17 have been executed, the operator arranges the liquid discharger in the liquid stay area range in which the liquid discharger is to be arranged, while he/she watches the image of FIG. 27, and lays out the liquid discharge paths (drain pipes or vent pipes) connected to the liquid discharger.

In accordance with the present embodiment, the operator can readily identify the position at which at least one of the drain or the vent is to be arranged, that is, the liquid stay area range, in the system configuration of the plant having a complex three-dimensional structure. Thus, the liquid discharge paths such as vent pipes and drain pipes can be properly connected to the layout object. Since the graphic pattern of the liquid stay area is displayed in the different color than that of the graphic pattern of the layout object, the operator can exactly identify the liquid stay area range in the layout object. Further, since the color is different from type to type of the liquid stay areas, the operator can also readily identify the type. As described above with respect to the step 13, the liquid stay area is determined based on the liquid discharger arrangement rule. Accordingly, the setting precision of the liquid stay area range in the layout object is significantly improved. Because of the check in the step 13E, the liquid stay area range in which the liquid discharger is to be really arranged can be set and the arrangement of unnecessary liquid discharger is avoided, and the construction of the assembled plant is simplified. In the present embodiment, only the center line of the layout object is not considered but the upper and lower plane levels of the three-dimension structure are considered. Accordingly, for example, in a reducer in which a diameter varies, the level of the center line does not vary but the upper and lower plane levels vary, the drain stay area and the air stay area can be exactly determined.

Through the steps 14 and 15, only the liquid stay area range in which the liquid discharger is to be newly arranged can be identified when the layout object is not a new layout (for example, a modified layout).

Figure 28:
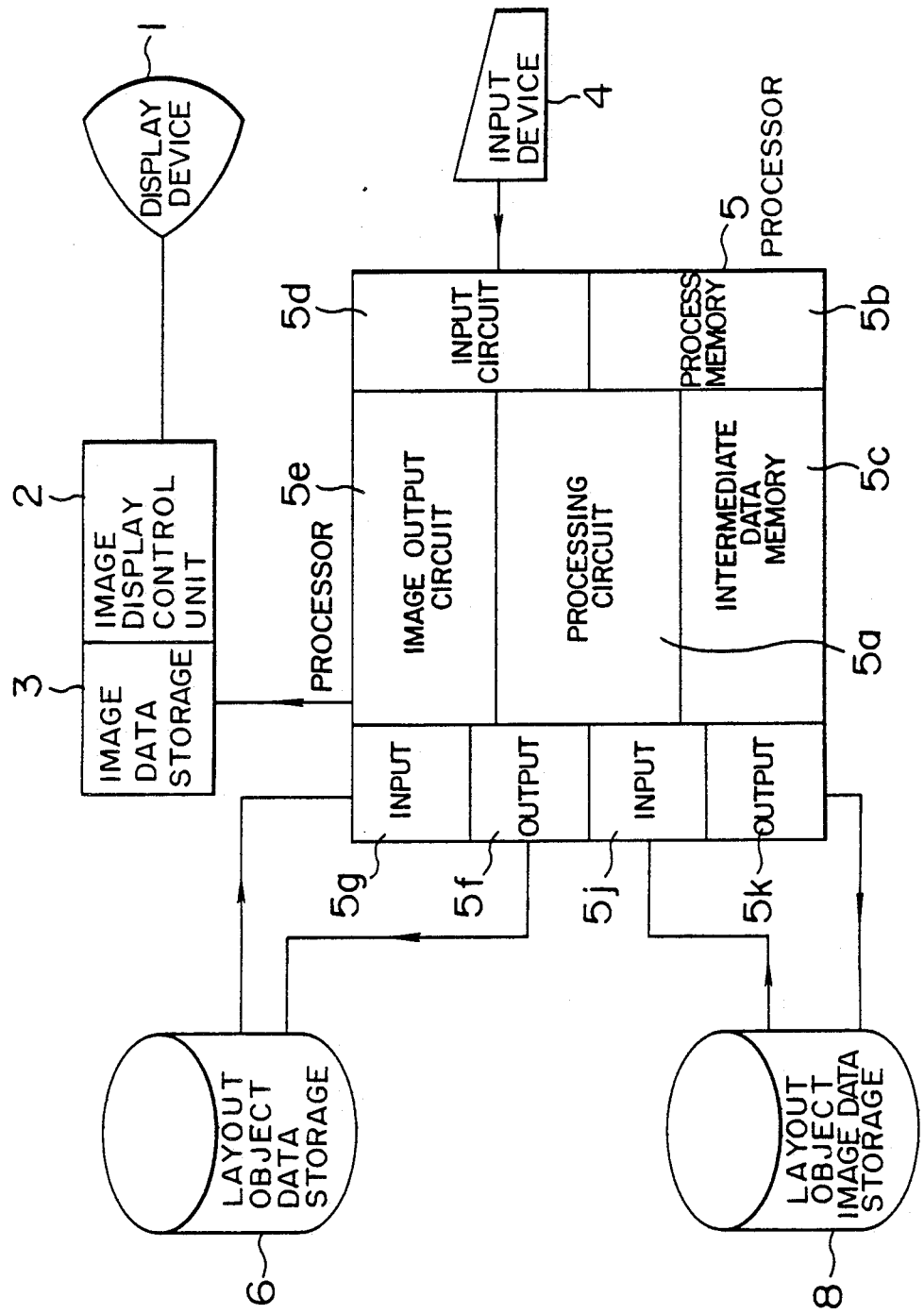
FIG. 28 shows a configuration of another embodiment of the computer assisted design apparatus of the present invention.
Figure 29:
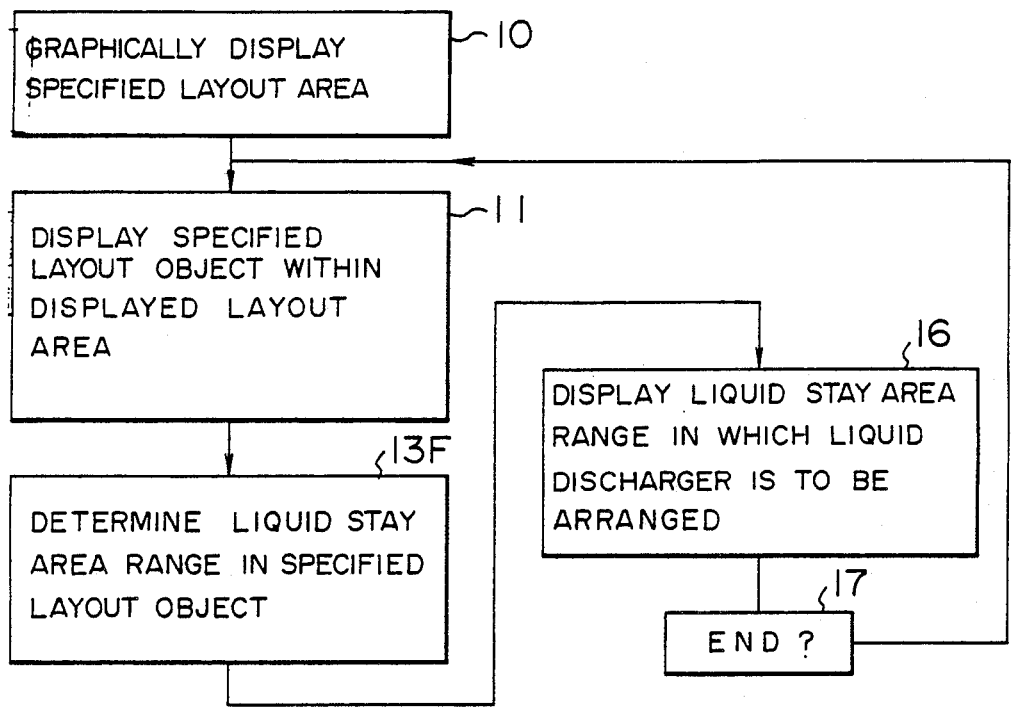
FIG. 29 shows a process executed by the embodiment of FIG. 28.

Another embodiment of the computer assisted design apparatus of the present invention is explained. As shown in FIG. 28, the present embodiment is of the same construction as that of the embodiment of FIG. 1 except for the absence of the liquid discharger arrangement rule storage 7, the liquid discharger arrangement rule input circuit 5h and the output circuit 5i. In further detail, the process stored in the process memory 5b of the present embodiment is slightly different from that of the previous embodiment. FIG. 29 shows a process executed in the present embodiment. In this process, the steps 12, 13C-13E, 14 and 15 of the process in the previous embodiment are excluded and a step 13G is added. Only the difference from the previous embodiment is explained in detail.

Figure 31:
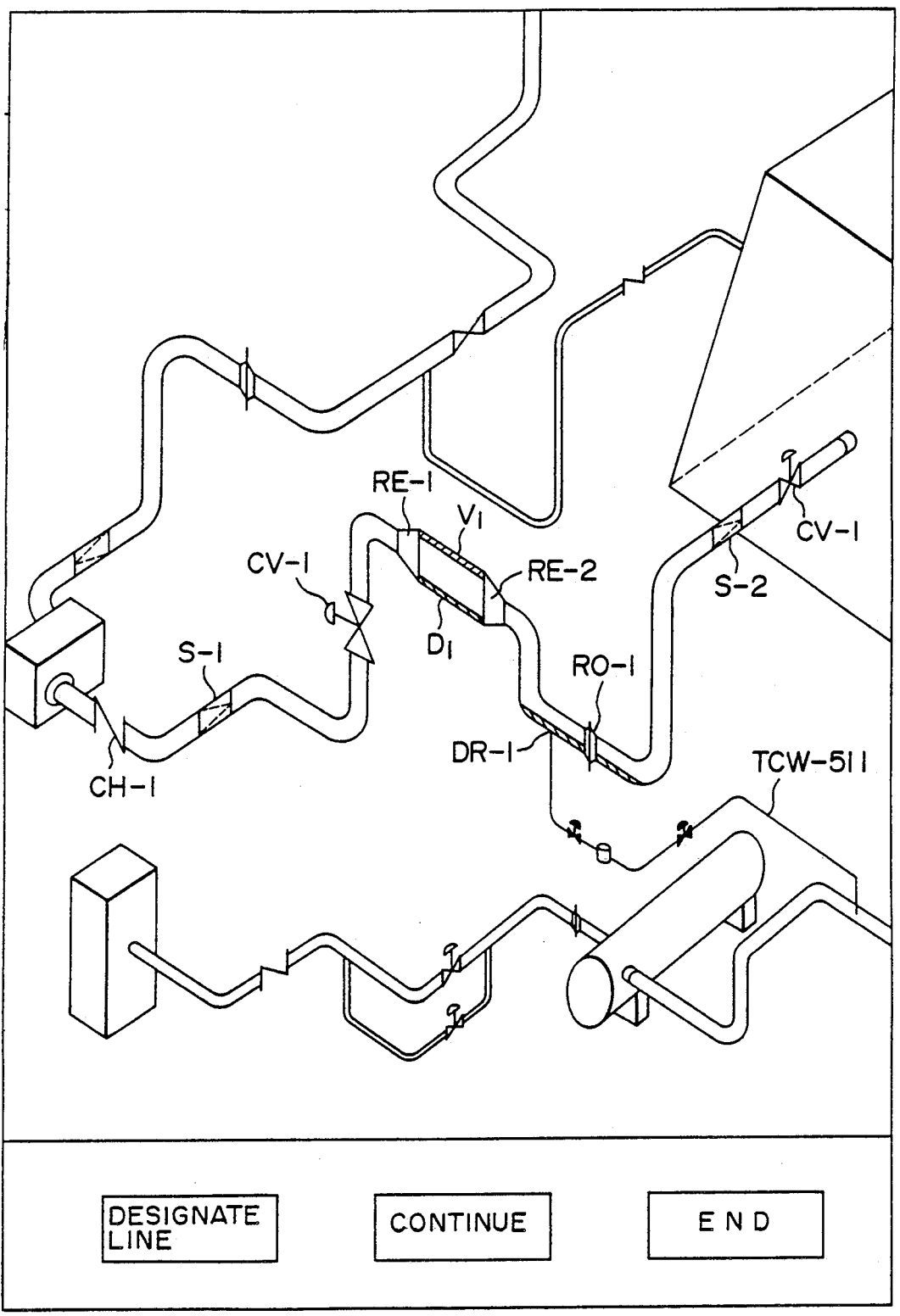
FIG. 31 shows an image produced in a step 16 of FIG. 29.

Like the previous embodiment, the steps 10 and 11 are executed. After the step 11, the step 13F is executed. The operation in the step 13F is identical to that of the step 13 in the previous embodiment but a specific procedure is different. As shown in FIG. 30, the step 13F comprises steps 13A, 13B and 13G. The detail of the steps 13A and 13B of the step 13 has been described in the previous embodiment. In the step 13G, the low point and high point data (FIG. 18) stored in the intermediate data memory 5c in the step 13B is fetched and the ranges of the low point layout reference points No. 9, No. 10 and No. 12-No. 15 are set in the drain stay area range. The ranges of the high point layout reference points No. 9 and No. 10 are set in the vent stay area range. Those liquid stay area ranges are stored in the intermediate data memory 5c. After the step 13G, the steps 16 and 17 are executed like the previous embodiment. The image of the present embodiment produced in the step 16 is shown in FIG. 31. $V_1$ denotes a vent stay area range and $D_1$ denotes a drain stay area range.

In accordance with the present embodiment, the advantages excluding those attained by the steps 13-15 of the previous embodiment are attained. In the present embodiment, since the liquid stay area range is set based on the levels of the components of the layout object as shown in the step 13F, it is true that the extraction of the liquid stay area in the specified layout object involves leakage and the setting precision of the liquid stay area range is lower than that in the previous embodiment. However, in the present embodiment, since the entire liquid stay area range is graphically displayed although the steps 14 and 15 are omitted, the graphic pattern of the liquid discharge path is displayed if the liquid discharger (for example, drain seat or vent seat) has been provided in the specified layout object and the liquid discharge paths (for example, drain pipes or vent pipes) are connected to the liquid discharger, and the operator can recognize, at a glance, those liquid stay areas to which the liquid discharge paths are to be connected and those liquid stay areas to which the liquid discharge paths have been connected. In the present embodiment, of the all liquid stay area ranges determined in the step 13F, those liquid stay areas having the liquid discharge paths laid out in the specified layout object are graphically displayed together with the liquid discharge paths, and those liquid stay areas having no liquid discharge path are graphically displayed alone.

Figure 34:
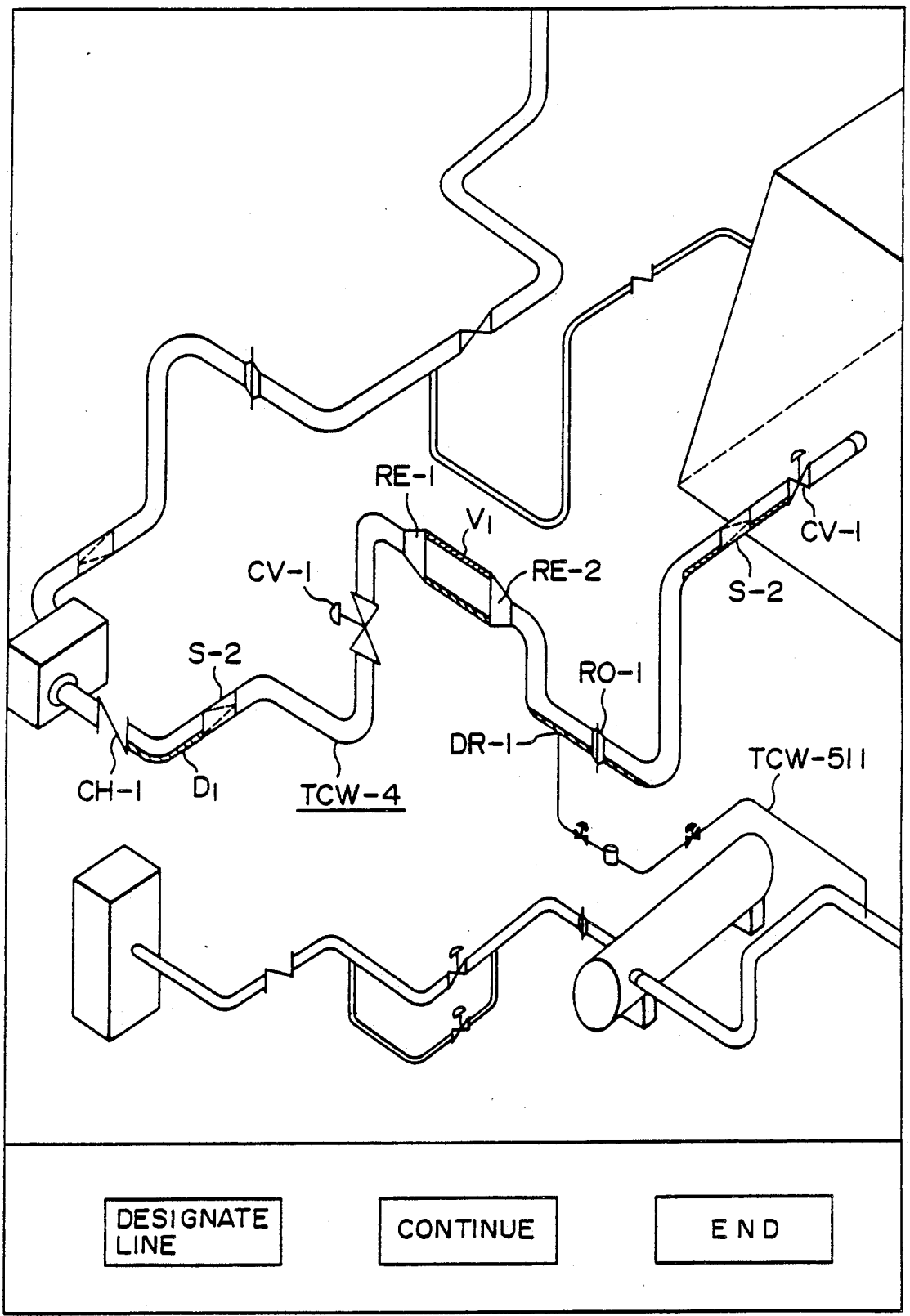

Other embodiment of the computer assisted design apparatus of the present invention is now explained. In the present embodiment, the apparatus of the embodiment of FIG. 1 is used and the process shown in FIG. 32 instead of the process of FIG. 2 is stored in the process memory 5b. The process of the present embodiment comprises steps 10, 11, 13, 16 and 18-23. Like the process of FIG. 29, the steps 12, 14 and 15 of FIG. 2 have been removed and steps 18-23 which are not present in the process of FIG. 2 have been added. In the present embodiment, the steps 10, 11, 13 and 16 are executed in sequence. The steps 10, 11, 13 and 16 of the present embodiment are identical to the steps of FIG. 2. At the end of the step 16, the image shown in FIG. 31 is displayed on the screen of the display device 1. In the image shown in FIG. 34, five drain stay area ranges shown in FIG. 24A and one air stay area range shown in FIG. 24B are displayed.

Figure 33:
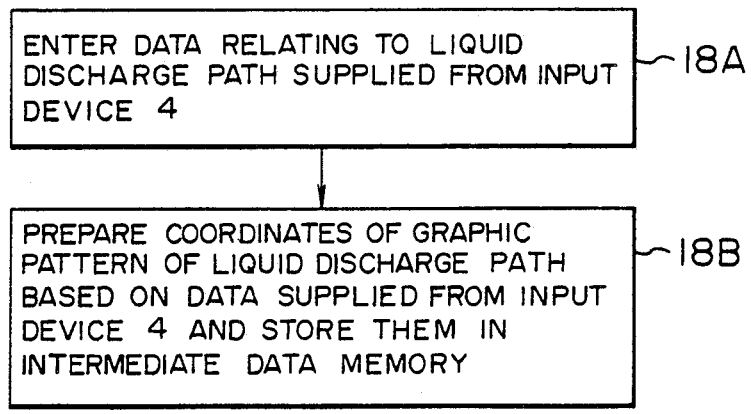
FIG. 33 shows a detailed process of a step 18 of FIG. 32, FIGS. 34 and 35 show images displayed in a step 19.
Figure 35:
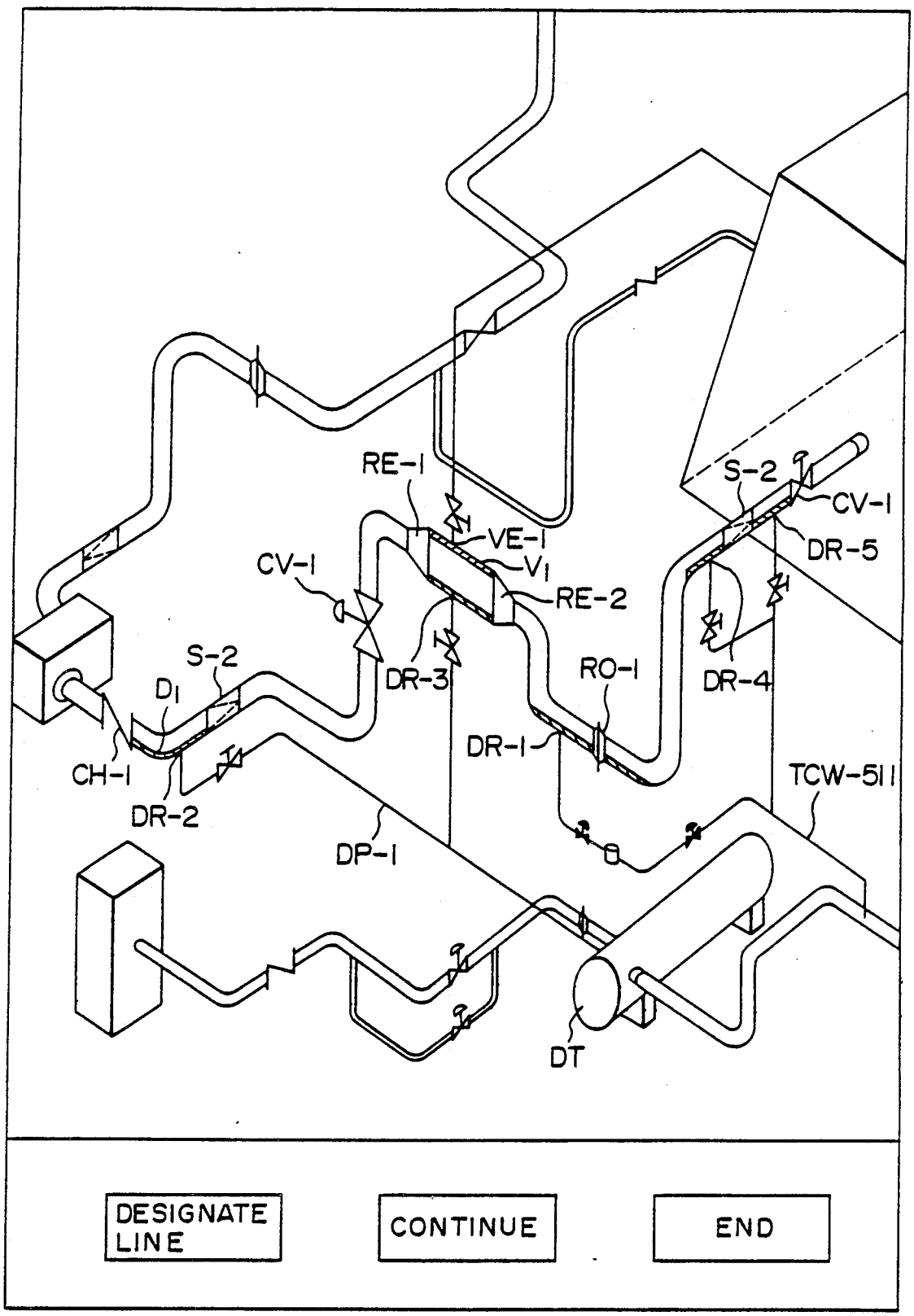

The operator, by watching the image (FIG. 34) displayed on the screen of the display device 1, can clearly discriminate the liquid stay area ranges in which the liquid discharge paths have been arranged and the liquid stay area ranges in which the liquid discharge path is not arranged. The operator specifies one of the liquid stay area ranges in which the liquid discharge path is not arranged, and lays out the liquid discharge paths arranged in the specified liquid stay area range. In laying out the liquid discharge paths, the operator enters data of the diameter, start point (liquid discharger in the liquid stay area range) end point and curve point of each of the liquid discharger paths to be arranged in the specified liquid stay area range, by the input device 4, while he/she watches the image. Based on the input data, the graphic data for the liquid discharge path to be arranged in the specified area range is prepared (step 8). As shown in FIG. 33 in detail, the step 18 comprises steps 18A and 18B. In the step 18A, the data relating to the liquid discharge path designated by the operator through the input device 4 is entered through the input circuit 5d and stored in the intermediate data storage 5c. In the step 18B, the coordinates of the graphic pattern after the layout of one liquid discharge path to be arranged in one specified liquid stay area range are prepared based on the input data. After the step 18b, a step 19 is executed. In the step 19, the coordinates of the graphic pattern of the liquid discharge path stored in the intermediate data storage 5c are fetched and supplied to the image data storage 3 through the output circuit 5e. The coordinates of the graphic pattern of the liquid discharge path supplied to the image data storage 3 are supplied to the display device 1 and the graphic pattern of the liquid discharge path is displayed on the screen. For example, in the step 18A, the drain stay area No. 1 range shown in FIG. 24 is specified and the data of the liquid discharge path to be arranged therein is inputted. The graphic pattern of the liquid discharge path is displayed on the screen of the display device 1 as shown by DP-1 in FIG. 35. DR-2 denotes a liquid discharger or drain seat specified in one liquid stay area range. A container DT in FIG. 35 is a drain tank. In a step 20, interference between the laid-out liquid discharge path and other pipes and equipments such as the layout objects which have been laid out is examined, and the result is displayed on the screen. Namely, the crossing between the graphic data of the liquid discharge path displayed on the display device 1 in the step 19 and the graphic data of other graphic patterns which have already been displayed is examined (except at start point and end point of the liquid discharge path). If there is a crossing portion, the crossing portion is flickered on the screen to indicate "interference". If the flicker occurs on the screen of the display device 1, the operator can recognize the interference between the laid-out liquid discharge path and other structure as well as the interference point. The operator inputs modified data of the liquid discharge path through the input device 4 in order to eliminate the interference. In the apparatus of the present embodiment, if the interference occurs, the step 18 is executed in response to the decision (NO) in the step 21 following to the step 20 so that the modified data can be entered. Based on the input modified data, the steps 18–21 are again executed. In the step 20, if the graphic data prepared in the step 18 does not interfere with other graphic data, the step 21 is executed and then the process proceeds to the step 22. In the step 22, the graphic data (for example, graphic data DP-1) of the liquid discharge path prepared in the step 18 is supplied to the layout object image data storage 8 through the output circuit 5j and stored in the storage 8. Based on this graphic data, the layout object data of the specified layout object (for example, TCW-4) in the layout object data storage 6 is updated. In the present embodiment, the coordinates of the drain seat are newly stored in the storage 6 as data TCW-4. In storing the graphic data of the liquid discharge path into the storage 8, the graphic data of the liquid stay area range is stored in a separate area from that of the image data of the layout object in order to avoid overlapped display of the graphic pattern of the liquid stay area range on a hard copy of the specified layout object. As a result, the hard copy of the layout graphic pattern of the specified layout object is easy to watch. If the graphic data of the liquid stay area range is required, it may be separately specified through the input device 4. In a step 23, whether the liquid discharge paths have been arranged in all liquid stay area ranges of the specified layout object or not is examined. If they have not yet been arranged, the process returns to the step 18. The steps 18–23 are repeated until the arrangement of the liquid discharge paths to all liquid stay area ranges is completed. When "end" is detected in the step 23, the graphic patterns of all liquid discharge paths arranged in all liquid stay area ranges of the specified layout object are displayed (FIG. 35), and the graphic data therefor are stored in the layout object image data storage 8, and the layout object data on the specified layout object in the layout object data memory 6 is updated. By this updating, the coordinates of DR-3, DR-4 and DR-5 (drain seats) and VE-1 (vent seat) of FIG. 35 in addition to DR-2 are stored, as new layout object data for TCW-4, in the layout object data storage 6.

If "end" is detected in the step 23, the step 17 of FIG. 1 (not shown in FIG. 23) is executed.

The step 23 may be executed between the step 21 and the step 22. In this case, all data relating to all liquid discharge paths to be arranged in all liquid stay area ranges of the specified layout object may be stored in the respective storages in one time in the step 22.

In accordance with the present embodiment, the advantages attained by the embodiment of FIG. 1 which executes the process of FIG. 2, except for the advantage attained by the steps 14 and 15, are attained. Like the embodiment of FIG. 28 which executes the process of FIG. 29, all liquid stay area ranges are graphically displayed so that the operator can recognize, at a glance, the liquid stay areas in which the liquid discharge paths have been arranged and the liquid stay areas in which the liquid discharge paths are to be arranged. Thus, after the layout of the liquid discharge paths, the operator can readily check whether the liquid discharge path has been arranged in each liquid stay area, by watching the screen of the display 1. Further, based on the data of the liquid discharge paths entered by the operator through the input device 4 in the steps 18 and 19, the liquid discharge paths can be readily laid out.

Figure 36:
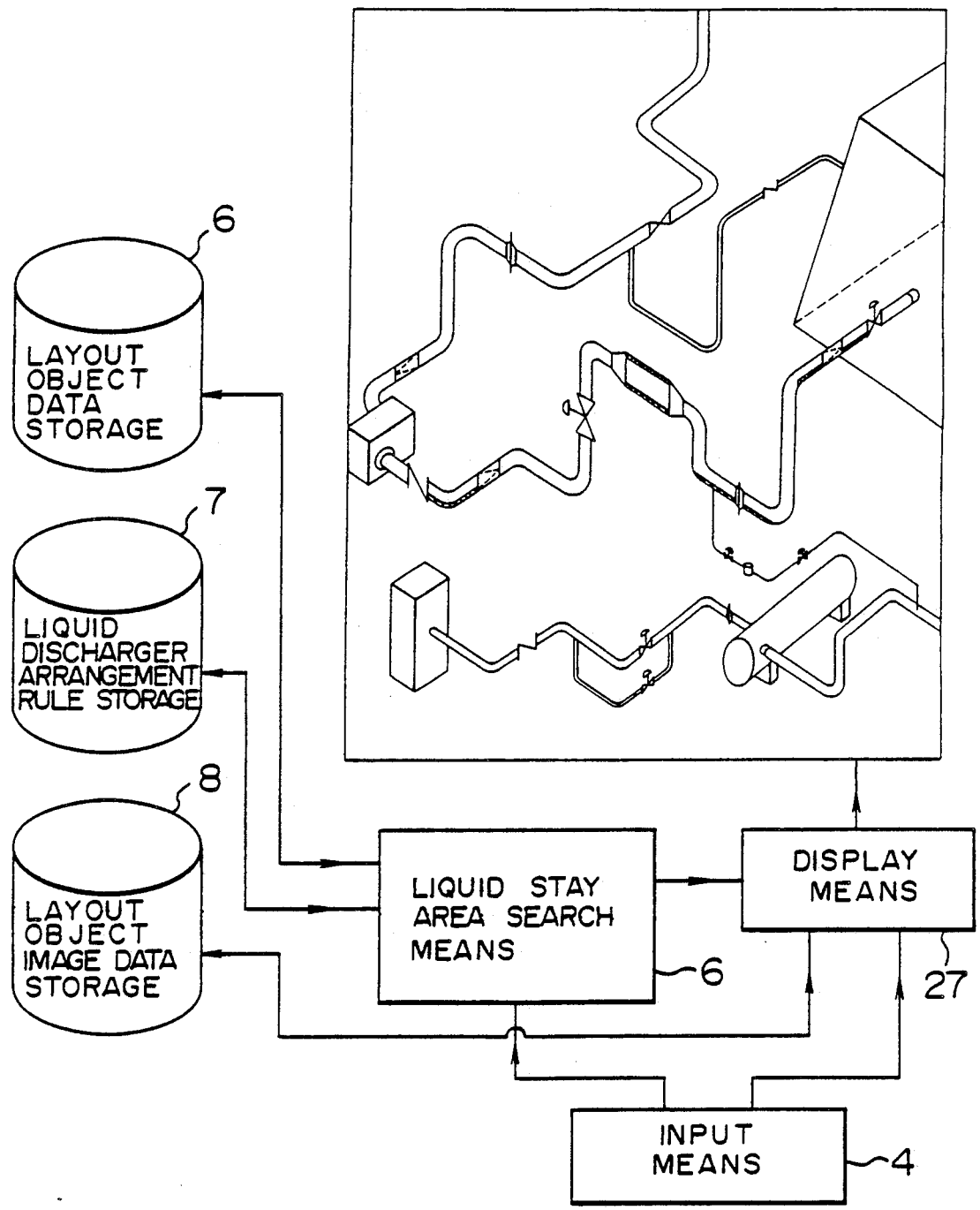
FIG. 36 shows a configuration of other embodiment of the present invention.

Other embodiment of the present invention is explained with reference to FIG. 36. The present embodiment of the computer assisted design apparatus comprises a display device 1, an input device 4, a layout object data storage 6, a liquid discharger arrangement rule storage 7, a layout object image data storage 8, liquid stay area search means 26 and display means 27. The liquid stay area search means 26 executes steps 11 and 13 of the process of FIG. 32. It searches the positions of all liquid stay areas in the specified layout object entered by the operator through the input device 4. The display means 27 executes the steps 10 and 16 of FIG. 32. In the step 10, it selects the image of the layout area specified through the input device 4 from the layout object image data storage 8 and displays it on the screen of the display device 1. In the step 16, it graphically displays the positions of the liquid stay areas in the specified layout object determined by the liquid stay area search means 26, on the screen of the display device 1. In the present embodiment, the step 10 is executed by the display means 27, the steps 11 and 13 are executed by the liquid stay area search means 26, and the step 16 is executed by the display means 27, sequentially.

Figure 32:
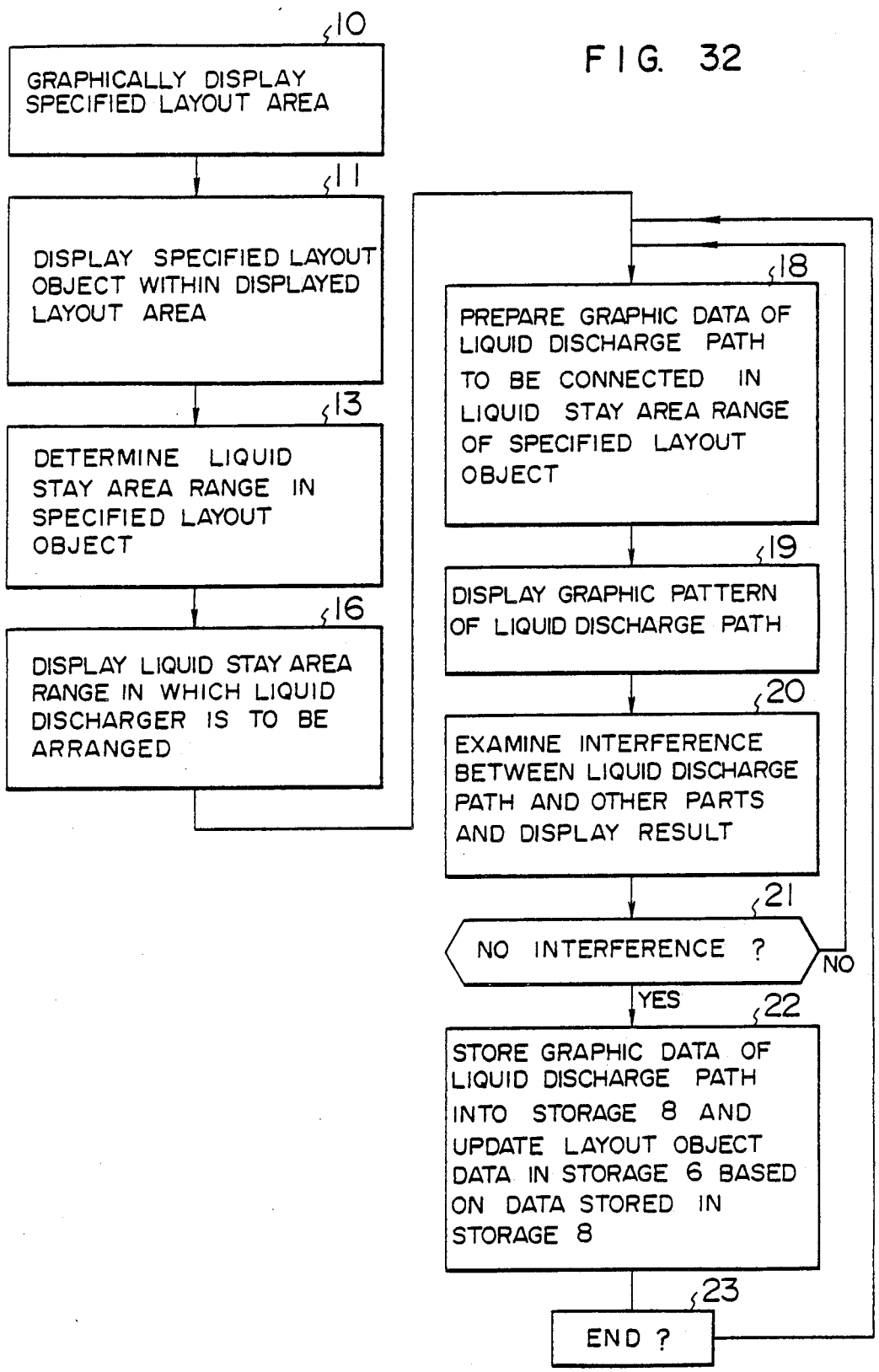
FIG. 32 shows another process executed by the apparatus of FIG. 1.

The present embodiment attains the advantages of the previous embodiment which executes the process of FIG. 32, excluding the advantage attained by the steps 18 and 19.

What is claimed is:

1. A design assistance apparatus for interactively changing an image of a layout object on a screen of a display device, comprising:

means for determining a position of a liquid stay area relative to a liquid discharger to be connected thereto in a layout object specified by an input means; and means for graphically displaying on said display device said determined position of said liquid stay area based on a position of said liquid discharger.

2. A design assistance apparatus comprising:

means for selecting layout object data and first graphic data of a layout object specified by an input means from layout object data and first graphic data which graphically represents layout objects stored in a storage;

means for generating second graphic data graphically representing a liquid stay area for said specified layout object based on said selected layout object data;

means for determining a position at which said liquid stay area is formed in said specified layout object based on said selected layout object data and a selected liquid discharger arrangement rule; and means for displaying graphic patterns of said specified layout object and said liquid stray area based on said first and second graphic data.

3. A design assistance apparatus comprising:
an input device;
first storage means for storing first graphic data for graphically representing a layout object;
second storage means for storing layout object data;
third storage means for storing a process which includes process steps of: selecting first graphic data of a layout object specified by said input device from said first storage means; selecting layout object data of said specified layout object from said second storage means; and generating second graphic data for graphically representing a liquid stay area for said specified layout object based on said selected layout object data;
processor means for performing said process steps stored in said third storage means; and
a display device for displaying said first and second graphic data selected and generated respectively by said processor means.

4. A design assistance apparatus comprising:
an input device;
first storage means for storing first graphic data for graphically representing a layout object;
second storage means for storing layout object data;
third storage means for storing a process which includes process steps of: selecting first graphic data of a layout object specified by said input device from said first storage means; selecting the layout object data of said specified layout object from said second storage means; generating second graphic data representing a liquid stay area for said specified layout object based on said selected layout object data; effecting a graphical display of said liquid stay area for said specified layout object based on said second graphic data and selected layout object data; and effecting a display of a graphic pattern of said liquid stay area in a form which is discriminated from a graphic pattern of said layout object;
process means for performing said process steps stored in said third storage means; and
display device for displaying first and second graphic data selected and generated respectively by said processor means.

5. A design assistance apparatus comprising:
an input device;
first storage means for storing first graphic data for graphically representing a layout object;
second storage means for storing layout object data;
third storage means for storing liquid discharger arrangement rules;
fourth storage means for storing a process which includes process steps of: selecting first graphic data of a layout object specified by said input device; from said first storage means; selecting layout object data of said specified layout object from said second storage means; generating second graphic data graphically representing a liquid stay area for said specified layout object based on said selected layout object data; selecting a liquid discharger arrangement rule from said third storage means; said selected layout object data, and said selected liquid discharger arrangement rule;
processor means for performing said process steps stored in said fourth storage means; and in accordance with said process, thereby selecting first graphic data, selecting layout object data, generating second graphic data, selecting a liquid discharger arrangement rule and effecting a graphical display; and
a display device for displaying said first and second graphic data selected and generated respectively by said processor means.

6. A design assistance apparatus comprising:
an input device;
first storage means for storing first graphic data for graphically representing a layout object;
second storage means for storing layout object data;
third storage means for storing a process which includes process steps of: selecting first graphic data of a layout object specified by said input device from said first storage means; selecting layout object data of said specified layout object from said second storage means; generating second graphic data for graphically representing a liquid stay area for said specified layout object based on said selected layout object data: and generating third graphic data for graphically representing a liquid discharge path to be connected to said liquid stay area of said specified layout object based on input data from said input device;
processor means for performing said process steps stored in said third storage means; and
a display device for displaying said first graphic data and said second and third graphic data selected and generated respectively by said processor means.

7. A design assistance method for use in a computer assisted design apparatus including input means, a display device, a storage and a processor connected to said input means, said display device and said storage for performing design assistance operations, comprising the steps of:
selecting, by said processor, layout object data of a layout object specified by said input means and first graphic data graphically representing said specified layout object from layout object data and first graphic data which graphically represents said layout object including liquid discharge paths stored in said storage;
generating, by said processor, second graphic data which graphically represents a liquid stay area for said specified layout object based on said selected layout object data; and displaying, by said processor, graphic patterns of said specified layout object including said liquid discharge path and said liquid stay area based on said first and second graphic data on said display device.

8. A design assistance method according to claim 7 wherein said generating step includes a step for applying information, for discriminating said graphic pattern of said liquid stay area from said graphic pattern of said layout object when said graphic patterns are displayed on said display device, to said second graphic data.

9. A design assistance method according to claim 8 wherein said applying step applied color information for different display from said display of said first graphic data, to said second graphic data.

10. A design assistance method for use in a computer assisted design apparatus including input means, a display device, a storage and a processor connected to said input means, said display device and said storage for performing design assistance operations, comprising the steps of:

selecting, by said processor, layout object data and first graphic data of a layout object specified by said input means, said first graphic data graphically representing said specified layout object based on said layout object data, said first graphic data and said layout object data being stored in said storage;

selecting, by said processor, a liquid discharger arrangement rule related to said specified layout object from liquid discharger arrangement rules stored in said storage;

generating, by said processor, second graphic data graphically representing a liquid stay area for said specified layout object based on said selected layout object data;

determining a position at which said liquid stay area is formed in said specified layout object based on said selected layout object data and said selected liquid discharger arrangement rule; and displaying, by said processor, graphic patterns of said specified layout object and said liquid stay area based on said first and second graphic data, on said display device.

11. A design assistance method according to claim 10 wherein said liquid stay area is at least one of a vent stay area and a drain stay area.

12. A design assistance method according to claim 10 further comprising a step of:

displaying, by said processor, said selected liquid discharger arrangement rule on said display device.

13. A design assistance method according to claim 10 wherein said generating step includes a step for generating said second graphic data of said liquid stay are to which no liquid discharge path is connected.

14. A design assistance method according to claim 10 wherein said generating step includes a step for applying information, for discriminating a graphic pattern of said liquid stay area from a graphic pattern of said layout object when said graphic patterns are displayed on said display device, to said second graphic data.

15. A design assistance method according to claim 14 wherein said applying step applies color information, for different display from the display of the first graphic data, to the second graphic data.

16. A design assistance method according to claim 10 further comprising the steps of:

generating, by said processor, third graphic data graphically representing a liquid discharge path to be connected to said liquid stay area of said specified layout object based on data input by said input means; and displaying, by said processor, said graphic pattern of said liquid discharge path based on said third graphic data together with said graphic patterns of said specified layout object and said liquid stay area on said display device.

17. A design assistance method according to claim 16 further comprising the steps of:

checking by said processor, interference between said liquid discharge path and at least one of said specified layout object and other liquid discharge paths;

displaying, by said processor, a result of said checking step on said display device; and updating, by said processor, when there is no interference said first graphic data stored in said storage to said first graphic data containing said generated third graphic data.

18. A design assistance method according to claim 10, further including a step for determining whether a liquid discharger is arranged in said liquid stay area.

19. A design assistance method according to claim 18, further including a step for displaying a liquid stay area having no liquid discharger which is to be arranged with a liquid discharger.

* * * * *